(12) United States Patent
Fox

(10) Patent No.: US 10,871,561 B2
(45) Date of Patent: Dec. 22, 2020

(54) APPARATUS AND METHODS FOR SYNTHETIC APERTURE RADAR WITH DIGITAL BEAMFORMING

(71) Applicants: Urthecast Corp, Vancouver (CA); King Abdulaziz City of Science and Technology, Riyadh (SA)

(72) Inventor: Peter Allen Fox, Burnaby (CA)

(73) Assignee: Urthecast Corp., Vancouver (CA)

( * ) Notice: Subject to any disclaimer, the term of this patent is extended or adjusted under 35 U.S.C. 154(b) by 148 days.

(21) Appl. No.: 15/561,437

(22) PCT Filed: Mar. 17, 2016

(86) PCT No.: PCT/US2016/022841
§ 371 (c)(1),
(2) Date: Sep. 25, 2017

(87) PCT Pub. No.: WO2016/153914
PCT Pub. Date: Sep. 29, 2016

(65) Prior Publication Data
US 2018/0252807 A1    Sep. 6, 2018

Related U.S. Application Data

(60) Provisional application No. 62/137,934, filed on Mar. 25, 2015.

(51) Int. Cl.
*G01S 13/90*    (2006.01)
*G01S 13/10*    (2006.01)
(Continued)

(52) U.S. Cl.
CPC ............ *G01S 13/904* (2019.05); *G01S 7/025* (2013.01); *G01S 13/106* (2013.01); *G01S 13/30* (2013.01);
(Continued)

(58) Field of Classification Search
CPC ...... G01S 13/904; G01S 7/025; G01S 13/106; G01S 13/30; G01S 13/90; G01S 13/9076
(Continued)

(56) References Cited

U.S. PATENT DOCUMENTS

| | | |
|---|---|---|
| 3,193,830 A | 7/1965 | Provencher |
| 3,241,140 A | 3/1966 | Raabe |

(Continued)

FOREIGN PATENT DOCUMENTS

| | | |
|---|---|---|
| CA | 2428513 C | 7/2003 |
| CA | 2488909 C | 5/2005 |

(Continued)

OTHER PUBLICATIONS

Partial Supplementary Search Report issued in European Application No. 15829734.1, dated Dec. 21, 2017, 16 pages.

(Continued)

*Primary Examiner* — Bo Fan
(74) *Attorney, Agent, or Firm* — Grossman, Tucker, Perreault & Pfleger, PLLC

(57) ABSTRACT

A digital beamforming synthetic aperture radar (SAR) mixes a first analog signal to generate a frequency-shifted first signal having a first spectral band, mixes a second analog signal to generate a frequency-shifted second signal having a second spectral band, positioned at a defined frequency offset from the first spectral band, and positioned non-overlapping relation with the first spectral band, combines the first and second frequency-shifted signals to generate a combined analog receive signal, and band-pass samples the combined analog receive signal to generate a digital baseband signal representative of the first and second analog signals. The SAR may mix the second analog signal to position the second spectral band in the Nyquist bandwidth, and in non-overlapping relationship with the first spectral (Continued)

band. Mixing may include down converting the analog signal.

13 Claims, 15 Drawing Sheets

(51) Int. Cl.
    *G01S 7/02*         (2006.01)
    *G01S 13/30*       (2006.01)
    *G01S 7/282*       (2006.01)
    *G01S 13/02*       (2006.01)
    *G01S 7/285*       (2006.01)
    *G01S 7/03*         (2006.01)

(52) U.S. Cl.
    CPC ............... *G01S 13/90* (2013.01); *G01S 7/032* (2013.01); *G01S 7/282* (2013.01); *G01S 7/285* (2013.01); *G01S 13/9076* (2019.05); *G01S 2013/0245* (2013.01); *G01S 2013/0254* (2013.01)

(58) Field of Classification Search
    USPC .......... 342/25, 149, 194, 417, 107, 441, 372
    See application file for complete search history.

(56) References Cited

U.S. PATENT DOCUMENTS

| | | | |
|---|---|---|---|
| 3,460,139 A | 8/1969 | Rittenbach | |
| 3,601,529 A | 8/1971 | Dischert | |
| 3,715,962 A | 2/1973 | Yost, Jr. | |
| 3,808,357 A | 4/1974 | Nakagaki et al. | |
| 4,163,247 A | 7/1979 | Bock et al. | |
| 4,214,264 A | 7/1980 | Hayward et al. | |
| 4,246,598 A | 1/1981 | Bock et al. | |
| 4,404,586 A | 9/1983 | Tabei | |
| 4,514,755 A | 4/1985 | Tabei | |
| 4,656,508 A | 4/1987 | Yokota | |
| 4,803,645 A | 2/1989 | Ohtomo et al. | |
| 4,823,186 A | 4/1989 | Muramatsu | |
| 4,924,229 A | 5/1990 | Eichel et al. | |
| 4,951,136 A | 8/1990 | Drescher et al. | |
| 4,989,008 A | 1/1991 | Fujisaka | |
| 5,057,843 A | 10/1991 | Dubois et al. | |
| 5,059,966 A | 10/1991 | Fujisaka et al. | |
| 5,093,663 A | 3/1992 | Baechtiger et al. | |
| 5,173,949 A | 12/1992 | Peregrim et al. | |
| 5,248,979 A | 9/1993 | Orme et al. | |
| 5,313,210 A | 5/1994 | Gail | |
| 5,486,830 A | 1/1996 | Axline, Jr. et al. | |
| 5,489,907 A | 2/1996 | Zink et al. | |
| 5,512,899 A | 4/1996 | Osawa et al. | |
| 5,546,091 A | 8/1996 | Haugen et al. | |
| 5,552,787 A | 9/1996 | Schuler et al. | |
| 5,646,623 A | 7/1997 | Walters et al. | |
| 5,745,069 A | 4/1998 | Gail | |
| 5,760,899 A | 6/1998 | Eismann | |
| 5,790,188 A | 8/1998 | Sun | |
| 5,821,895 A | 10/1998 | Hounam et al. | |
| 5,883,584 A | 3/1999 | Langemann et al. | |
| 5,926,125 A | 7/1999 | Wood | |
| 5,945,940 A | 8/1999 | Cuomo | |
| 5,949,914 A | 9/1999 | Yuen | |
| 5,952,971 A | 9/1999 | Strickland | |
| 5,973,634 A | 10/1999 | Kare | |
| 6,007,027 A | 12/1999 | Diekelman et al. | |
| 6,122,404 A | 9/2000 | Barter et al. | |
| 6,241,192 B1 | 6/2001 | Kondo et al. | |
| 6,259,396 B1 | 7/2001 | Pham et al. | |
| 6,347,762 B1 | 2/2002 | Sims et al. | |
| 6,359,584 B1 | 3/2002 | Cordey et al. | |
| 6,502,790 B1 | 1/2003 | Murphy | |
| 6,577,266 B1 | 6/2003 | Axline | |
| 6,614,813 B1 | 9/2003 | Dudley et al. | |
| 6,633,253 B2 | 10/2003 | Cataldo | |
| 6,678,048 B1 | 1/2004 | Rienstra et al. | |
| 6,741,250 B1 | 5/2004 | Furlan et al. | |
| 6,781,540 B1 | 8/2004 | MacKey et al. | |
| 6,781,707 B2 | 8/2004 | Peters et al. | |
| 6,831,688 B2 | 12/2004 | Lareau et al. | |
| 6,861,996 B2 | 3/2005 | Jeong | |
| 6,864,827 B1 | 3/2005 | Tise et al. | |
| 6,914,553 B1 | 7/2005 | Beadle et al. | |
| 6,919,839 B1 | 7/2005 | Beadle et al. | |
| 6,970,142 B1 | 11/2005 | Pleva et al. | |
| 7,015,855 B1 | 3/2006 | Medl et al. | |
| 7,019,777 B2 | 3/2006 | Sun | |
| 7,034,746 B1 | 4/2006 | McMakin et al. | |
| 7,064,702 B1 | 6/2006 | Abatzoglou | |
| 7,095,359 B2 | 8/2006 | Matsuoka et al. | |
| 7,123,169 B2 | 10/2006 | Farmer et al. | |
| 7,149,366 B1 | 12/2006 | Sun | |
| 7,158,878 B2 | 1/2007 | Rasmussen et al. | |
| 7,167,280 B2 | 1/2007 | Bogdanowicz et al. | |
| 7,212,149 B2 | 5/2007 | Abatzoglou et al. | |
| 7,218,268 B2 | 5/2007 | VandenBerg | |
| 7,242,342 B2 | 7/2007 | Wu et al. | |
| 7,270,299 B1 | 9/2007 | Murphy | |
| 7,292,723 B2 | 11/2007 | Tedesco et al. | |
| 7,298,922 B1 | 11/2007 | Lindgren et al. | |
| 7,327,305 B2 | 2/2008 | Loehner et al. | |
| 7,348,917 B2 | 3/2008 | Stankwitz et al. | |
| 7,379,612 B2 | 5/2008 | Milanfar et al. | |
| 7,385,705 B1 | 6/2008 | Hoctor et al. | |
| 7,412,107 B2 | 8/2008 | Milanfar et al. | |
| 7,414,706 B2 | 8/2008 | Nichols et al. | |
| 7,417,210 B2 | 8/2008 | Ax, Jr. et al. | |
| 7,423,577 B1 | 9/2008 | McIntire et al. | |
| 7,468,504 B2 | 12/2008 | Halvis et al. | |
| 7,475,054 B2 | 1/2009 | Hearing et al. | |
| 7,477,802 B2 | 1/2009 | Milanfar et al. | |
| 7,486,221 B2 | 2/2009 | Meyers et al. | |
| 7,536,365 B2 | 5/2009 | Aboutalib | |
| 7,545,309 B1 | 6/2009 | McIntire et al. | |
| 7,548,185 B2 | 6/2009 | Sheen et al. | |
| 7,570,202 B2 | 8/2009 | Raney | |
| 7,599,790 B2 | 10/2009 | Rasmussen et al. | |
| 7,602,997 B2 | 10/2009 | Young | |
| 7,623,064 B2 | 11/2009 | Calderbank et al. | |
| 7,646,326 B2 | 1/2010 | Antonik et al. | |
| 7,698,668 B2 | 4/2010 | Balasubramanian et al. | |
| 7,705,766 B2 | 4/2010 | Lancashire et al. | |
| 7,733,961 B2 | 6/2010 | O'Hara et al. | |
| 7,746,267 B2 | 6/2010 | Raney | |
| 7,769,229 B2 | 8/2010 | O'Brien et al. | |
| 7,769,241 B2 | 8/2010 | Adams, Jr. et al. | |
| 7,781,716 B2 | 8/2010 | Anderson et al. | |
| 7,825,847 B2 | 11/2010 | Fujimura | |
| 7,830,430 B2 | 11/2010 | Adams, Jr. et al. | |
| 7,844,127 B2 | 11/2010 | Adams, Jr. et al. | |
| 7,855,740 B2 | 12/2010 | Hamilton, Jr. et al. | |
| 7,855,752 B2 | 12/2010 | Baker et al. | |
| 7,876,257 B2 | 1/2011 | Vetro et al. | |
| 7,884,752 B2 | 2/2011 | Hellsten et al. | |
| 7,897,902 B2 | 3/2011 | Katzir et al. | |
| 7,911,372 B2 | 3/2011 | Nelson | |
| 7,924,210 B2 | 4/2011 | Johnson | |
| 7,936,949 B2 | 5/2011 | Riley et al. | |
| 7,940,282 B2 | 5/2011 | Milanfar et al. | |
| 7,940,959 B2 | 5/2011 | Rubenstein | |
| 7,991,226 B2 | 8/2011 | Schultz et al. | |
| 8,013,778 B2 | 9/2011 | Grafmueller et al. | |
| 8,031,258 B2 | 10/2011 | Enge et al. | |
| 8,040,273 B2 | 10/2011 | Tomich et al. | |
| 8,045,024 B2 | 10/2011 | Kumar et al. | |
| 8,049,657 B2 | 11/2011 | Prats et al. | |
| 8,053,720 B2 | 11/2011 | Han et al. | |
| 8,059,023 B2 | 11/2011 | Richard | |
| 8,068,153 B2 | 11/2011 | Kumar et al. | |
| 8,073,246 B2 | 12/2011 | Adams, Jr. et al. | |
| 8,078,009 B2 | 12/2011 | Riley et al. | |
| 8,090,312 B2 | 1/2012 | Robinson | |
| 8,094,960 B2 | 1/2012 | Riley et al. | |

(56) References Cited

U.S. PATENT DOCUMENTS

| | | |
|---|---|---|
| 8,111,307 B2 | 2/2012 | Deever et al. |
| 8,115,666 B2 | 2/2012 | Moussally et al. |
| 8,116,576 B2 | 2/2012 | Kondo |
| 8,125,370 B1 | 2/2012 | Rogers et al. |
| 8,125,546 B2 | 2/2012 | Adams, Jr. et al. |
| 8,134,490 B2 | 3/2012 | Gebert et al. |
| 8,138,961 B2 | 3/2012 | Deshpande |
| 8,169,358 B1 | 5/2012 | Bourdelais et al. |
| 8,169,362 B2 | 5/2012 | Cook et al. |
| 8,179,445 B2 | 5/2012 | Hao |
| 8,180,851 B1 | 5/2012 | Cavelie |
| 8,194,296 B2 | 6/2012 | Compton et al. |
| 8,203,615 B2 | 6/2012 | Wang et al. |
| 8,203,633 B2 | 6/2012 | Adams, Jr. et al. |
| 8,204,966 B1 | 6/2012 | Mendis et al. |
| 8,212,711 B1 | 7/2012 | Schultz et al. |
| 8,274,422 B1 | 9/2012 | Smith et al. |
| 8,299,959 B2 | 10/2012 | Vossiek et al. |
| 8,358,359 B2 | 1/2013 | Baker et al. |
| 8,362,944 B2 | 1/2013 | Lancashire |
| 8,384,583 B2 | 2/2013 | Leva et al. |
| 8,411,146 B2 | 4/2013 | Twede |
| 8,441,393 B2 | 5/2013 | Strauch et al. |
| 8,482,452 B2 | 7/2013 | Chambers et al. |
| 8,487,996 B2 | 7/2013 | Mann et al. |
| 8,493,262 B2 | 7/2013 | Boufounos et al. |
| 8,493,264 B2 | 7/2013 | Sasakawa |
| 8,502,730 B2 | 8/2013 | Roche |
| 8,532,958 B2 | 9/2013 | Ingram et al. |
| 8,543,255 B2 | 9/2013 | Wood et al. |
| 8,558,735 B2 | 10/2013 | Bachmann et al. |
| 8,576,111 B2 | 11/2013 | Smith et al. |
| 8,594,375 B1 | 11/2013 | Padwick |
| 8,610,771 B2 | 12/2013 | Leung et al. |
| 8,698,668 B2 | 4/2014 | Hellsten |
| 8,711,029 B2 | 4/2014 | Ferretti et al. |
| 8,723,721 B2 | 5/2014 | Moruzzis et al. |
| 8,724,918 B2 | 5/2014 | Abraham |
| 8,760,634 B2 | 6/2014 | Rose |
| 8,768,104 B2 | 7/2014 | Moses et al. |
| 8,803,732 B2 | 8/2014 | Antonik et al. |
| 8,823,813 B2 | 9/2014 | Mantzel et al. |
| 8,824,544 B2 | 9/2014 | Nguyen et al. |
| 8,836,573 B2 | 9/2014 | Yanagihara et al. |
| 8,854,253 B2 | 10/2014 | Edvardsson |
| 8,854,255 B1 | 10/2014 | Ehret |
| 8,860,824 B2 | 10/2014 | Jelinek |
| 8,861,588 B2 | 10/2014 | Nguyen et al. |
| 8,879,793 B2 | 11/2014 | Peterson |
| 8,879,865 B2 | 11/2014 | Li et al. |
| 8,879,996 B2 | 11/2014 | Kenney et al. |
| 8,891,066 B2 | 11/2014 | Bamler et al. |
| 8,903,134 B2 | 12/2014 | Abileah |
| 8,912,950 B2 | 12/2014 | Adcook |
| 8,957,806 B2 | 2/2015 | Schaefer |
| 8,977,062 B2 | 3/2015 | Gonzalez et al. |
| 8,988,273 B2 | 3/2015 | Marianer et al. |
| 9,013,348 B2 | 4/2015 | Riedel et al. |
| 9,019,143 B2 | 4/2015 | Obermeyer |
| 9,019,144 B2 | 4/2015 | Calabrese |
| 9,037,414 B1 | 5/2015 | Pratt |
| 9,063,544 B2 | 6/2015 | Vian et al. |
| 9,071,337 B2 | 6/2015 | Hellsten |
| 9,106,857 B1 | 8/2015 | Faramarzpour |
| 9,126,700 B2 | 9/2015 | Ozkul et al. |
| 9,134,414 B2 | 9/2015 | Bergeron et al. |
| 9,148,601 B2 | 9/2015 | Fox |
| 9,176,227 B2 | 11/2015 | Bergeron et al. |
| 9,182,483 B2 | 11/2015 | Liu et al. |
| 9,210,403 B2 | 12/2015 | Martinerie et al. |
| 9,244,155 B2 | 1/2016 | Bielas |
| 9,261,592 B2 | 2/2016 | Boufounos et al. |
| 9,291,711 B2 | 3/2016 | Healy, Jr. et al. |
| 9,329,263 B2 | 5/2016 | Haynes et al. |
| 9,389,311 B1 | 7/2016 | Moya et al. |
| 9,395,437 B2 | 7/2016 | Ton et al. |
| 9,400,329 B2 | 7/2016 | Pillay |
| 9,411,039 B2 | 8/2016 | Dehlink et al. |
| 9,417,323 B2 | 8/2016 | Carande et al. |
| 9,426,397 B2 | 8/2016 | Wein |
| 9,529,081 B2 | 12/2016 | Whelan et al. |
| 9,531,081 B2 | 12/2016 | Huber et al. |
| 9,684,071 B2 | 6/2017 | Wishart |
| 9,684,673 B2 | 6/2017 | Beckett et al. |
| 10,230,925 B2 | 3/2019 | Maciejewski et al. |
| 2001/0013566 A1 | 8/2001 | Yung et al. |
| 2002/0003502 A1 | 1/2002 | Falk |
| 2002/0147544 A1 | 10/2002 | Nicosia et al. |
| 2002/0196178 A1 | 12/2002 | Beard |
| 2003/0006364 A1 | 1/2003 | Katzir et al. |
| 2004/0021600 A1 | 2/2004 | Wittenberg |
| 2004/0104859 A1 | 6/2004 | Lo |
| 2004/0150547 A1 | 8/2004 | Suess et al. |
| 2004/0227659 A1 | 11/2004 | Woodford et al. |
| 2005/0212692 A1 | 9/2005 | Iny et al. |
| 2005/0270299 A1 | 12/2005 | Rasmussen et al. |
| 2005/0288859 A1 | 12/2005 | Golding et al. |
| 2006/0132753 A1 | 6/2006 | Nichols et al. |
| 2007/0024879 A1 | 2/2007 | Hamilton, Jr. et al. |
| 2007/0051890 A1 | 3/2007 | Pittman |
| 2007/0080830 A1 | 4/2007 | Sacks |
| 2007/0102629 A1 | 5/2007 | Richard et al. |
| 2007/0120979 A1 | 5/2007 | Zhang et al. |
| 2007/0146195 A1 | 6/2007 | Wallenberg et al. |
| 2007/0168370 A1 | 7/2007 | Hardy |
| 2007/0192391 A1 | 8/2007 | McEwan |
| 2007/0279284 A1 | 12/2007 | Karayil Thekkoott Narayanan |
| 2008/0074338 A1 | 3/2008 | Vacanti |
| 2008/0081556 A1 | 4/2008 | Robinson |
| 2008/0123997 A1 | 5/2008 | Adams et al. |
| 2008/0240602 A1 | 10/2008 | Adams et al. |
| 2009/0011777 A1 | 1/2009 | Grunebach et al. |
| 2009/0021588 A1 | 1/2009 | Border et al. |
| 2009/0046182 A1 | 2/2009 | Adams, Jr. et al. |
| 2009/0046995 A1 | 2/2009 | Kanumuri et al. |
| 2009/0051585 A1 | 2/2009 | Krikorian et al. |
| 2009/0087087 A1 | 4/2009 | Palum et al. |
| 2009/0109086 A1 | 4/2009 | Krieger et al. |
| 2009/0147112 A1 | 6/2009 | Baldwin |
| 2009/0226114 A1 | 9/2009 | Choi et al. |
| 2009/0256909 A1 | 10/2009 | Nixon |
| 2009/0289838 A1 | 11/2009 | Braun |
| 2010/0039313 A1 | 2/2010 | Morris |
| 2010/0045513 A1 | 2/2010 | Pett et al. |
| 2010/0063733 A1 | 3/2010 | Yunck |
| 2010/0128137 A1 | 5/2010 | Guidash |
| 2010/0149396 A1 | 6/2010 | Summa et al. |
| 2010/0194901 A1 | 8/2010 | van Hoorebeke et al. |
| 2010/0232692 A1 | 9/2010 | Kumar et al. |
| 2010/0302418 A1 | 12/2010 | Adams, Jr. et al. |
| 2010/0309347 A1 | 12/2010 | Adams, Jr. et al. |
| 2010/0321235 A1 | 12/2010 | Vossiek et al. |
| 2010/0328499 A1 | 12/2010 | Sun |
| 2011/0052095 A1 | 3/2011 | Deever |
| 2011/0055290 A1 | 3/2011 | Li et al. |
| 2011/0098986 A1 | 4/2011 | Fernandes Rodrigues et al. |
| 2011/0115793 A1 | 5/2011 | Grycewicz |
| 2011/0115954 A1 | 5/2011 | Compton |
| 2011/0134224 A1 | 6/2011 | McClatchie |
| 2011/0156878 A1 | 6/2011 | Wu et al. |
| 2011/0175771 A1 | 7/2011 | Raney |
| 2011/0187902 A1 | 8/2011 | Adams, Jr. et al. |
| 2011/0199492 A1 | 8/2011 | Kauker et al. |
| 2011/0279702 A1 | 11/2011 | Plowman et al. |
| 2011/0282871 A1 | 11/2011 | Seefeld et al. |
| 2012/0019660 A1 | 1/2012 | Golan et al. |
| 2012/0044328 A1 | 2/2012 | Gere |
| 2012/0076229 A1* | 3/2012 | Brobston .......... H04W 52/0206 375/295 |
| 2012/0105276 A1 | 5/2012 | Ryland |
| 2012/0127028 A1 | 5/2012 | Bamler et al. |
| 2012/0127331 A1 | 5/2012 | Grycewicz |
| 2012/0133550 A1 | 5/2012 | Benninghofen et al. |
| 2012/0146869 A1 | 6/2012 | Holland et al. |

(56) References Cited

U.S. PATENT DOCUMENTS

| | | |
|---|---|---|
| 2012/0154203 A1* | 6/2012 | Vacanti .............. G01S 13/44 342/149 |
| 2012/0154584 A1 | 6/2012 | Omer et al. |
| 2012/0200703 A1 | 8/2012 | Nadir et al. |
| 2012/0201427 A1 | 8/2012 | Jasinski et al. |
| 2012/0257047 A1 | 10/2012 | Biesemans et al. |
| 2012/0271609 A1 | 10/2012 | Laake et al. |
| 2012/0274505 A1 | 11/2012 | Pritt et al. |
| 2012/0293669 A1 | 11/2012 | Mann et al. |
| 2012/0323992 A1 | 12/2012 | Brobst et al. |
| 2013/0021475 A1 | 1/2013 | Canant et al. |
| 2013/0050488 A1 | 2/2013 | Brouard et al. |
| 2013/0063489 A1 | 3/2013 | Hourie et al. |
| 2013/0080594 A1 | 3/2013 | Nourse et al. |
| 2013/0120205 A1 | 5/2013 | Thompson et al. |
| 2013/0169471 A1* | 7/2013 | Lynch .............. G01S 13/343 342/107 |
| 2013/0169485 A1* | 7/2013 | Lynch .............. G01S 3/46 342/417 |
| 2013/0201050 A1 | 8/2013 | Hellsten |
| 2013/0234879 A1 | 9/2013 | Wilson-Langman et al. |
| 2013/0257641 A1 | 10/2013 | Ronning |
| 2013/0293411 A1* | 11/2013 | Dehlink .............. G01S 7/03 342/194 |
| 2013/0321228 A1 | 12/2013 | Crockett, Jr. et al. |
| 2013/0321229 A1 | 12/2013 | Klefenz et al. |
| 2013/0335256 A1 | 12/2013 | Smith et al. |
| 2014/0027576 A1 | 1/2014 | Boshuizen et al. |
| 2014/0062764 A1 | 3/2014 | Reis et al. |
| 2014/0068439 A1 | 3/2014 | Lacaze et al. |
| 2014/0078153 A1 | 3/2014 | Richardson |
| 2014/0149372 A1 | 5/2014 | Sankar et al. |
| 2014/0191894 A1 | 7/2014 | Chen et al. |
| 2014/0232591 A1 | 8/2014 | Liu et al. |
| 2014/0266868 A1 | 9/2014 | Schuman |
| 2014/0282035 A1 | 9/2014 | Murthy et al. |
| 2014/0307950 A1 | 10/2014 | Jancsary et al. |
| 2014/0313071 A1 | 10/2014 | McCorkle |
| 2014/0344296 A1 | 11/2014 | Chawathe et al. |
| 2015/0015692 A1 | 1/2015 | Smart |
| 2015/0054678 A1 | 2/2015 | Wakayama |
| 2015/0080725 A1 | 3/2015 | Wegner |
| 2015/0145716 A1 | 5/2015 | Woodsum |
| 2015/0160337 A1 | 6/2015 | Muff |
| 2015/0168554 A1 | 6/2015 | Aharoni et al. |
| 2015/0247923 A1 | 9/2015 | LaBarca et al. |
| 2015/0253423 A1 | 9/2015 | Liu et al. |
| 2015/0280326 A1 | 10/2015 | Arii |
| 2015/0323659 A1 | 11/2015 | Mitchell |
| 2015/0323665 A1 | 11/2015 | Murata |
| 2015/0323666 A1 | 11/2015 | Murata |
| 2015/0324989 A1 | 11/2015 | Smith et al. |
| 2015/0331097 A1 | 11/2015 | Hellsten |
| 2015/0346336 A1 | 12/2015 | Di Giorgio et al. |
| 2015/0369913 A1 | 12/2015 | Jung et al. |
| 2015/0371431 A1 | 12/2015 | Korb et al. |
| 2015/0378004 A1 | 12/2015 | Wilson-Langman et al. |
| 2015/0378018 A1 | 12/2015 | Calabrese |
| 2015/0379957 A1 | 12/2015 | Roegelein et al. |
| 2016/0012367 A1 | 1/2016 | Korb et al. |
| 2016/0019458 A1 | 1/2016 | Kaufhold |
| 2016/0020848 A1 | 1/2016 | Leonard |
| 2016/0033639 A1 | 2/2016 | Jung et al. |
| 2016/0109570 A1 | 4/2016 | Calabrese |
| 2016/0139259 A1 | 5/2016 | Rappaport et al. |
| 2016/0139261 A1 | 5/2016 | Becker |
| 2016/0170018 A1 | 6/2016 | Yamaoka |
| 2016/0202347 A1 | 7/2016 | Malinovskiy et al. |
| 2016/0204514 A1 | 7/2016 | Miraftab et al. |
| 2016/0216372 A1 | 7/2016 | Liu et al. |
| 2016/0223642 A1 | 8/2016 | Moore et al. |
| 2016/0238696 A1 | 8/2016 | Hintz |
| 2016/0282463 A1 | 9/2016 | Guy et al. |
| 2016/0300375 A1 | 10/2016 | Beckett et al. |
| 2016/0306824 A1 | 10/2016 | Lopez et al. |
| 2017/0160381 A1 | 6/2017 | Cho et al. |
| 2017/0170567 A1 | 6/2017 | Bing et al. |
| 2017/0214889 A1 | 7/2017 | Maciejewski et al. |
| 2018/0172823 A1 | 6/2018 | Tyc |
| 2018/0172824 A1 | 6/2018 | Beckett et al. |
| 2018/0322784 A1 | 11/2018 | Schild |
| 2018/0335518 A1 | 11/2018 | Fox |
| 2018/0356516 A1 | 12/2018 | Fox |
| 2018/0366837 A1 | 12/2018 | Fox et al. |

FOREIGN PATENT DOCUMENTS

| | | |
|---|---|---|
| CA | 2553008 C | 1/2007 |
| CA | 2827279 A1 | 4/2014 |
| CN | 101907704 A | 12/2010 |
| CN | 102394379 A | 3/2012 |
| CN | 102983410 | 3/2013 |
| CN | 103414027 | 11/2013 |
| CN | 103679714 A | 3/2014 |
| DE | 102007039095 A1 | 2/2009 |
| DE | 202009003286 U1 | 5/2009 |
| EP | 0 924 534 A2 | 6/1999 |
| EP | 0 846 960 B1 | 3/2004 |
| EP | 1 504 287 | 2/2005 |
| EP | 1698856 A2 | 9/2006 |
| EP | 1509784 B1 | 2/2008 |
| EP | 1746437 B1 | 9/2008 |
| EP | 1966630 B1 | 9/2008 |
| EP | 2 230 533 A1 | 9/2010 |
| EP | 2 242 252 A2 | 10/2010 |
| EP | 2392943 B1 | 7/2011 |
| EP | 2416174 A1 | 8/2012 |
| EP | 2560144 A2 | 2/2013 |
| EP | 2610636 A1 | 7/2013 |
| EP | 2762916 A2 | 8/2014 |
| EP | 2778635 A1 | 9/2014 |
| EP | 2 828 685 | 1/2015 |
| EP | 2 875 384 | 5/2015 |
| EP | 2662704 B1 | 1/2016 |
| EP | 2743727 B1 | 1/2016 |
| EP | 2759847 B1 | 1/2016 |
| EP | 2762917 B1 | 1/2016 |
| EP | 2767849 B1 | 1/2016 |
| EP | 2896971 B1 | 3/2016 |
| EP | 3012658 A1 | 4/2016 |
| EP | 3032648 A1 | 6/2016 |
| EP | 3 060 939 | 8/2016 |
| EP | 3056922 A2 | 8/2016 |
| EP | 2 784 537 B1 | 10/2016 |
| EP | 3 077 985 | 10/2016 |
| EP | 3 077 986 | 10/2016 |
| EP | 3 214 460 A1 | 9/2017 |
| JP | 56108976 A | 8/1981 |
| JP | 60-257380 A | 12/1985 |
| JP | 2001-122199 A | 5/2001 |
| KR | 10-2010-0035056 A | 4/2010 |
| KR | 10-2012-0000842 A | 1/2012 |
| KR | 10-1461129 B1 | 11/2014 |
| KR | 10-2016-0002694 A | 1/2016 |
| RU | 2349513 C2 | 3/2009 |
| WO | 2000-055602 A1 | 9/2000 |
| WO | 02/18874 A1 | 3/2002 |
| WO | 2002-056053 A3 | 1/2003 |
| WO | 2003-005059 A1 | 1/2003 |
| WO | 03/040653 A1 | 5/2003 |
| WO | 2003-005080 A2 | 7/2003 |
| WO | 03/096064 A1 | 11/2003 |
| WO | 2007-076824 A2 | 7/2007 |
| WO | 2009-025825 A1 | 2/2009 |
| WO | 2009-030339 A1 | 3/2009 |
| WO | 2009-085305 A1 | 7/2009 |
| WO | 2010-052530 A1 | 5/2010 |
| WO | 2010/122327 A1 | 10/2010 |
| WO | 2011/138744 A2 | 11/2011 |
| WO | 2011-154804 A1 | 12/2011 |
| WO | 2012-120137 A1 | 9/2012 |
| WO | 2012-143756 A1 | 10/2012 |
| WO | 2012-148919 A2 | 11/2012 |
| WO | 2013/112955 A1 | 8/2013 |

(56) References Cited

FOREIGN PATENT DOCUMENTS

| | | | |
|---|---|---|---|
| WO | 2013-162657 | A1 | 10/2013 |
| WO | 2014/012828 | A1 | 1/2014 |
| WO | 2014/089318 | A1 | 6/2014 |
| WO | 2014-097263 | A1 | 6/2014 |
| WO | 2015-059043 | A1 | 4/2015 |
| WO | 2015/112263 | A2 | 7/2015 |
| WO | 2015/130365 | A2 | 9/2015 |
| WO | 2015/192056 | A1 | 12/2015 |
| WO | 2016/022637 | A1 | 2/2016 |
| WO | 2016-132106 | A1 | 8/2016 |
| WO | 2016/202662 | A1 | 12/2016 |
| WO | 2016/205406 | A1 | 12/2016 |
| WO | 2017/044168 | A2 | 3/2017 |
| WO | 2017/048339 | A1 | 3/2017 |
| WO | 2017/091747 | A1 | 6/2017 |
| WO | 2017/094157 | A1 | 6/2017 |

OTHER PUBLICATIONS

Preliminary Amendment filed in Application No. PCT/US2015/043739, dated Feb. 7, 2017, 12 pages.
International Search Report and Written Opinion issued in PCT Application No. PCT/US2015/043739, dated Nov. 11, 2015, 12 pages.
Preliminary Amendment filed in U.S. Appl. No. 15/561,437, dated Sep. 25, 2017, 11 pages.
International Search Report and Written Opinion issued in PCT Application No. PCT/US2016/022841, dated Jun. 3, 2016, 10 pages.
Preliminary Amendment filed in U.S. Appl. No. 15/737,065, dated Dec. 15, 2017, 8 pages.
International Search Report and Written Opinion issued in PCT Application No. PCT/US2016/037666, dated Mar. 27, 2017, 8 pages.
Preliminary Amendment filed in U.S. Appl. No. 15/737,016, dated Dec. 15, 2017, 8 pages.
International Search Report and Written Opinion issued in PCT Application No. PCT/US2016/037675, dated Feb. 16, 10 pages.
International Search Report and Written Opinion issued in PCT Application No. PCT/US2016/063630, dated Feb. 13, 2017, 8 pages.
Analog Devices, MT-085 Tutorial, "Fundamentals of Direct Digital Synthesis (DDS)", 2008, pp. 1-9.
Bordoni, Federica, et al.: "Calibration Error Model for Multichannel Spaceborne SAR Systems Based on Digital Beamforming", Proceedings of the 10th European Radar Conference, Oct. 9-11, 2013, pp. 184-187.
D'Aria, D., et al.: "A Wide Swath, Full Polarimetric, L band spaceborne SAR", IEEE, 2008, 4 pages.
El Sanhoury, Ahmed, et al.: "Performance Improvement of Pulsed OFDM UWB Systems Using ATF coding", ICCCE, May 11-13, 2010, IEEE, 4 pages.
Freeman: IEEE Transactions on Geoscience and Remote Sensing, vol. 38, No. 1, Jan. 1, 2000, pp. 320-324.
Freeman, Anthony, et al.: On the Detection of Faraday Rotation in Linearly Polarized L-Band SAR Backscatter Signatures, IEEE Transactions on Geoscience and Remote Sensing, vol. 42, No. 8, Aug. 2004, pp. 1607-1616.
Giuli, D., et al.: "Radar target scattering matrix measurement through orthogonal signals" IEE Proceedings-F, vol. 140, No. 4, Part F, Aug. 1993, pp. 233-242.
Hossain, Md Anowar, et al.: "Multi-Frequency Image Fusion Based on MIMO UWB OFDM Synthetic Aperture Radar", New Advances in Image Fusion, INTECH Open Science/Open Minds, 2013, 21 pages.
Kankaku, Y., et al.: "The Overview of the L-band SAR Onboard ALOS-2", Progress in Electromagnetics Research Symposium Proceedings, Moscow, Russia, Aug. 18-21, 2009, pp. 735-738.
Lombardo, P., et al.: "Monitoring and surveillance potentialities obtained by splitting the antenna of the COSMO-SkyMed SAR into multiple sub-apertures", The Institution of Engineering and Technology, IEE Proceedings, Apr. 2006, pp. 104-116.
Meyer, Franz J., et al.: "Prediction, Detection, and Correction of Faraday Rotation in Full-Polarimetric L-Band SAR Data", IEEE Transactions on Geoscience and Remote Sensing, vol. 46, No. 10, Oct. 2008, pp. 3076-3086.
Raney, Keith R.: "Hybrid-Polarity SAR Architecture", IEEE Transactions on Geoscience and Remote Sensing, vol. 45, No. 11, Nov. 2007, pp. 3397-3404.
Rouse, Shane, et al.: "Swathbuckler Wide Area SAR Processing Front End", IEEE 2006, pp. 673-678.
Rudolf, Hans: "Increase of Information by Polarimetric Radar Systems", Doctoral Dissertation, 2000, 5 pages.
Sakiotis, N.G., et al.: Proceedings of the I.R.E., 1953, pp. 87-93.
Souissi, B., et al.: "Investigation of the capabaility of the Compact Polarimetry mode to Reconstruct Full Polarimetry mode using RADARSAT2 data", Advanced Electromagnetics, Vo. 1, No. 1, May 2012, 10 pages.
Space Dynamics Laboratory, "Rasar", 2013, 2 pages.
Van Zyl, Jakob, et al.: "Synthetic Aperture Radar Polarimetry", JPL Space Science and Technology Series, 2010, 333 pages.
Werninghaus, Rolf, et al.: "The TerraSAR-X Mission", 2004, 4 pages.
Wolff: "Radar Basics-Exciter", Radartutorial.eu, http://www.radartutorial.eu/08.transmitters/Exciter.en.html, downloaded Mar. 6, 2018, 2 pages.
Wright, P.A., et al.: "Faraday Rotation Effects on L-Band Spaceborne SAR Data", IEEE Transactions on Geoscience and Remote Sensing, vol. 41, No. 12, Dec. 2003, pp. 2735-2744.
Zhang, T., et al.: "OFDM Synthetic Aperture Radar Imaging With Sufficient Cyclic Prefix", IEEE Transactions on Geoscience and Remote Sensing, vol. 53, No. 1, Jan. 2015, pp. 394-404.
European Communication issued in European Application No. 14883549.9, dated Nov. 24, 2017, 8 pages.
Notice of Allowance, dated Sep. 18, 2019, for U.S. Appl. No. 15/737,065, Peter Allen Fox et al., "Efficient Planar Phased Array Antenna Assembly," 9 pages.
Office Action, dated Oct. 4, 2019, for U.S. Appl. No. 15/737,044, Keith Dennis Richard Beckett et al., "System and Methods for Enhancing Synthetic Aperture Radar Imagery," 14 pages.
Office Action, dated Oct. 18, 2019, for U.S. Appl. No. 15/737,016, George Tyc, "Systems and Methods for Remote Sensing of the Earth From Space," 18 pages.
Foody, Gile M., "Status of Land Cover Classification Accuracy Assessment", University of Southampton, Jul. 21, 2001 (Year: 2001), 17 pages.
International Preliminary Report on Patentability issued in PCT Application No. PCT/US2016/037666, dated Dec. 28, 2017, 7 pages.
International Preliminary Report on Patentability issued in PCT Application No. PCT/US2016/037675, dated Dec. 28, 2017, 9 pages.
International Search Report and Written Opinion issued in PCT Application No. PCT/US2016/037681, dated Sep. 23, 2016, 10 pages.
International Preliminary Report on Patentability issued in PCT Application No. PCT/US2016/037681, dated Dec. 28, 2017, 7 pages.
Extended European Search Report issued in European Application No. 16844829.8, dated Apr. 25, 2018, 9 pages.
Supplementary Partial Search Report issued in European Application No. 16846990.6, dated May 18, 2018, 16 pages.
Extended European Search Report issued in European Application No. 16812363.6, dated May 14, 2018, 8 pages.
Larson & J R Wertz (EDS): "Orbit Maintenance," Space Mission Analysis and Design, Jan. 1, 1997, pp. 153-154, 177 (XP002214373), 15 pages.
"Envi Tutorials," Sep. 1, 2000, URL:http://heim.ifi.uio.no/"inf160/tutorial.pdf (XP055472060), 590 pages.
International Preliminary Report on Patentability issued in PCT Application No. PCT/US2016/022841, dated Oct. 5, 2017, 8 pages.

(56) References Cited

OTHER PUBLICATIONS

Extended European Search Report issued in European Application No. 16846990.6, dated Aug. 16, 2018, 16 pages.
Caltagirone et al., "The COSMO-SkyMed Dual Use Earth Observation Program: Development, Qualification, and Results of the Commissioning of the Overall Constellation", IEEE Journal of Selected Topics in Applied Earth Observations and Remote Sensing, IEEE, USA, vol. 7, No. 7, Jul. 1, 2014, (XP011557179), 9 pages.
"ISR Systems and Technology," Lincoln Laboratory, Massachusetts Institute of Technology, archived Jan. 19, 2017, URL=https://www.ll.mit.edu/mission/isr/israccomplishments.html, download date Oct. 8, 2018, 2 pages.
"Northrop's SABR radar completes auto target cueing capability demonstration," May 20, 2013, URL=https://www.airforce-technology.com/news/newsnorthrops-sabr-radar-completes-auto-target-cueing-capability-demonstration/, download date Oct. 8, 2018, 3 pages.
Amendment, filed Jan. 17, 2019, for U.S. Appl. No. 15/101,336, Lopez et al., "Systems and Methods for Earth Observation," 25 pages.
Amendment, filed Sep. 5, 2018, for U.S. Appl. No. 15/316,469, Maciejewski et al., "Systems and Methods for Processing and Providing Terrestrial and/or Space-Based Earth Observation," 9 pages.
Beckett et al., "Systems and Methods for Enhancing Synthetic Aperture Radar Imagery," U.S. Appl. No. 62/180,449, filed Jun. 16, 2015, 34 pages.
Beckett, "UrtheCast Second-Generation Earth Observation Sensors," *36th International Symposium on Remote Sensing of Environment*, Berlin, Germany, May 11-15, 2015, pp. 1069-1073.
Bickel et al., "Effects of Magneto-Ionic Propagation on the Polarization Scattering Matrix," *Proceedings of the IEEE* 53(8):1089-1091, 1965.
Bidigare, "MIMO Capacity of Radar as a Communications Channel," *Adaptive Sensor and Array Processing Workshop*, Lexington, Massachusetts, USA, Mar. 11-13, 2003, 19 pages.
Boccia, "Bathymetric Digital Elevation Model Generation from L-band and X-band Synthetic Aperture Radar Images in the Gulf of Naples, Italy: Innovative Techniques and Experimental Results," doctoral thesis, University of Naples Federico II, Naples, Italy, 2015, 161 pages.
Bordoni et al., "Ambiguity Suppression by Azimuth Phase Coding in Multichannel SAR Systems," *International Geoscience and Remote Sensing Symposium*, Vancouver, Canada, Jul. 24-29, 2011, 16 pages.
Brysk, "Measurement of the Scattering Matrix with an Intervening Ionosphere," *Transactions of the American Institute of Electrical Engineers* 77(5):611-612, 1958.
Di Iorio et al., "Innovation Technologies and Applications for Coastal Archaeological sites FP7-ITACA," *36th International Symposium on Remote Sensing of Environment*, Berlin, Germany, May 11-15, 2015, pp. 1367-1373.
Evans, "Venus, Unmasked: 25 Years Since the Arrival of Magellan at Earth's Evil Twin," Aug. 10, 2015, URL=http://www.americaspace.com/2015/08/10/venus-unmasked-25-years-since-the-arrival-of-magellan-at-earths-evil-twin/, download date Oct. 8, 2018, 4 pages.
Extended European Search Report, dated Mar. 27, 2018, for European Application No. 15829734.1-1206, 18 pages.
Extended European Search Report, dated Oct. 24, 2016, for European Application No. 14880012.1-1951, 10 pages.
Extended European Search Report, dated Oct. 24, 2016, for European Application No. 14883549.9-1951, 10 pages.
Fard et al., "Classifier Fusion of High-Resolution Optical and Synthetic Aperture Radar (SAR) Satellite Imagery for Classification in Urban Area," *1st International Conference on Geospatial Information Research*, Tehran, Iran, Nov. 15-17, 2014, 5 pages.
Forkuor et al., "Integration of Optical and Synthetic Aperture Radar Imagery for Improving Crop Mapping in Northwestern Benin, West Africa," *Remote Sensing* 6(7):6472-6499, 2014.
Fox et al., "Apparatus and Methods for a Synthetic Aperture Radar With Multi-Aperture Antenna," U.S. Appl. No. 62/510,182, filed May 23, 2017, 42 pages.
Fox et al., "Apparatus and Methods for a Synthetic Aperture Radar With Self-Cueing," U.S. Appl. No. 62/510,132, filed May 23, 2017, 39 pages.
Fox et al., "Range Ambiguity Suppression in Digital Multibeam," U.S. Appl. No. 62/590,153, filed Nov. 22, 2017, 19 pages.
Fox et al., "Synthetic Aperture Radar Imaging Apparatus and Methods for Moving Targets," U.S. Appl. No. 62/510,191, filed May 23, 2017, 24 pages.
Fox, "Apparatus and Methods for Quad-Polarized Synthetic Aperture Radar," U.S. Appl. No. 62/035,279, filed Aug. 8, 2014, 52 pages.
Fox, "Efficient Planar Phased Array Antenna Assembly," U.S. Appl. No. 62/180,421, filed Jun. 16, 2015, 33 pages.
Fox, "Synthetic Aperture Radar Imaging Apparatus and Methods," U.S. Appl. No. 62/260,063, filed Nov. 25, 2015, 41 pages.
Fox, "Synthetic Aperture Radar Imaging Apparatus and Methods," U.S. Appl. No. 62/510,123, filed May 23, 2017, 74 pages.
Hadjis, "Automatic Modulation Classification of Common Communication and Pulse Compression Radar Waveforms Using Cyclic Features," master's thesis, Air Force Institute of Technology, Wright-Patterson Air Force Base, Ohio, USA, Mar. 2013, 96 pages.
Heege et al., "Mapping of water depth, turbidity and sea state properties using multiple satellite sensors in aquatic systems," *Hydro 2010*, Rostock, Germany, Nov. 2-5, 2010, 27 pages.
Hoogeboom et al., "Integrated Observation Networks of the Future," *4th Forum on Global Monitoring for Environment and Security*, Baveno, Italy, Nov. 26-28, 2003, 14 pages.
Hounam et al., "A Technique for the Identification and Localization of SAR Targets Using Encoding Transponders," *IEEE Transactions on Geoscience and Remote Sensing* 39(1):3-7, 2001.
Huang et al., "Analog Beamforming and Digital Beamforming on Receive for Range Ambiguity Suppression in Spaceborne SAR," *International Journal of Antennas and Propagation* 2015:182080, 2015. (7 pages).
Huang et al., "ASTC-MIMO-TOPS Mode with Digital Beam-Forming in Elevation for High-Resolution Wide-Swath Imaging," *Remote Sensing* 7(3):2952-2970, 2015.
International Preliminary Report on Patentability, dated Dec. 15, 2016, for International Application No. PCT/US2015/035628, 8 pages.
International Preliminary Report on Patentability, dated Feb. 14, 2017, for International Application No. PCT/US2015/043739, 10 pages.
International Preliminary Report on Patentability, dated Jun. 7, 2016, for International Application No. PCT/US2014/068642, 10 pages.
International Preliminary Report on Patentability, dated Jun. 7, 2016, for International Application No. PCT/US2014/068645, 14 pages.
International Preliminary Report on Patentability, dated May 29, 2018, for International Application No. PCT/US2016/063630, 6 pages.
International Search Report and Written Opinion, dated Aug. 27, 2015, for International Application No. PCT/US2014/068642, 13 pages.
International Search Report and Written Opinion, dated Sep. 13, 2018, for International Application No. PCT/US2018/033970, 15 pages.
International Search Report and Written Opinion, dated Sep. 13, 2018, for International Application No. PCT/US2018/033971, 13 pages.
International Search Report and Written Opinion, dated Sep. 13, 2018, for International Application No. PCT/US2018/034144, 11 pages.
International Search Report and Written Opinion, dated Sep. 13, 2018, for International Application No. PCT/US2018/034146, 8 pages.
International Search Report and Written Opinion, dated Sep. 2, 2015, for International Application No. PCT/US2014/068645, 16 pages.

(56) References Cited

OTHER PUBLICATIONS

International Search Report and Written Opinion, dated Sep. 21, 2015, for International Application No. PCT/US2015/035628, 10 pages.
Kimura, "Calibration of Polarimetric PALSAR Imagery Affected by Faraday Rotation Using Polarization Orientation," *IEEE Transactions on Geoscience and Remote Sensing* 47(12):3943-3950, 2009.
Krieger et al., "CEBRAS: Cross Elevation Beam Range Ambiguity Suppression for High-Resolution Wide-Swath and MIMO-SAR Imaging," *International Geoscience and Remote Sensing Symposium*, Milan, Italy, Jul. 26-31, 2015, pp. 196-199.
Krieger et al., "Multidimensional Waveform Encoding: A New Digital Beamforming Technique for Synthetic Aperture Radar Remote Sensing," *IEEE Transactions on Geoscience and Remote Sensing* 46(1):31-46, 2008.
Linne von Berg, "Autonomous Networked Multi-Sensor Imaging Systems," *Imaging Systems and Applications*, Monterey, California, USA, Jun. 24-28, 2012, 2 pages.
Linne von Berg, "Multi-Sensor Airborne Imagery Collection and Processing Onboard Small Unmanned Systems," *Proceedings of SPIE* 7668(1):766807, 2010. (11 pages).
Livingstone et al., "RADARSTAT-2 System and Mode Description," *Systems Concepts and Integration Symposium*, Colorado Springs, Colorado, USA, Oct. 10-12, 2005, 22 pages.
Lopez et al., "Systems and Methods for Earth Observation," U.S. Appl. No. 61/911,914, filed Dec. 4, 2013, 177 pages.
Ma, "Application of RADARSTAT-2 Polarimetric Data for Land Use and Land Cover Classification and Crop Monitoring in Southwestern Ontario," master's thesis, The University of Western Ontario, Canada, 2013, 145 pages.
Maciejewski et al., "Systems and Methods for Processing and Providing Video," U.S. Appl. No. 62/011,935, filed Jun. 13, 2014, 52 pages.
Makar et al., "Real-Time Video Streaming With Interactive Region-of-Interest," *Proceedings of 2010 IEEE 17th International Conference on Image Processing*, Hong Kong, China, Sep. 26-29, 2010, pp. 4437-4440.
Meilland et al., "A Unified Rolling Shutter and Motion Blur Model for 3D Visual Registration," *IEEE International Conference on Computer Vision*, Sydney, Australia, Dec. 1-8, 2013, pp. 2016-2023.
National Instruments, "Direct Digital Synthesis," white paper, Dec. 30, 2016, 5 pages.
Notice of Allowance, dated Mar. 9, 2017, for U.S. Appl. No. 15/101,344, Beckett et al., "Systems and Methods for Processing and Distributing Earth Observation Images," 9 pages.
Notice of Allowance, dated Oct. 18, 2018, for U.S. Appl. No. 15/316,469, Maciejewski et al., "Systems and Methods for Processing and Providing Terrestrial and/or Space-Based Earth Observation Video," 8 pages.
Office Action, dated Apr. 23, 2018, for U.S. Appl. No. 15/316,469, Maciejewski et al., "Systems and Methods for Processing and Providing Terrestrial and/or Space-Based Earth Observation Video," 21 pages.
Office Action, dated Aug. 6, 2018, for U.S. Appl. No. 15/101,336, Lopez et al., "Systems and Methods for Earth Observation," 25 pages.
Office Action, dated Feb. 11, 2019, for U.S. Appl. No. 15/502,468, Fox, "Apparatus and Methods for Quad-Polarized Synthetic Aperture Radar," 42 pages.
Pleskachevsky et al., "Synergy and fusion of optical and synthetic aperture radar satellite data for underwater topography estimation in coastal areas," *Ocean Dynamics* 61(12):2099-2120, 2011.
Preliminary Amendment, filed Dec. 15, 2017, for U.S. Appl. No. 15/737,044, Beckett et al., "Systems and Methods for Enhancing Synthetic Aperture Radar Imagery," 10 pages.
Preliminary Amendment, filed Dec. 5, 2016, for U.S. Appl. No. 15/316,469, Maciejewski et al., "Systems and Methods for Processing and Providing Terrestrial and/or Space-Based Earth Observation Video," 9 pages.
Preliminary Amendment, filed Jun. 2, 2016, for U.S. Appl. No. 15/101,336, Lopez et al., "Systems and Methods for Processing and Distributing Earth Observation," 9 pages.
Preliminary Amendment, filed Jun. 2, 2016, for U.S. Appl. No. 15/101,344, Beckett et al., "Systems and Methods for Processing and Distributing Earth Observation Images," 11 pages.
Preliminary Amendment, filed May 22, 2018, for U.S. Appl. No. 15/778,188, Fox, "Synthetic Aperture Radar Imaging Apparatus and Methods," 9 pages.
Raouf et al., "Integrated Use of SAR and Optical Data for Coastal Zone Management," *Proceedings of the 3rd European Remote Sensing Symposium* vol. 2, Florence, Italy, Mar. 14-21, 1997, pp. 1089-1094.
Richardson, "By the Doppler's sharp stare," Oct. 1, 2003, *Armada International*, URL=https://www.thefreelibrary.com/_/print/PrintArticle.aspx?id=111508265, download date Oct. 8, 2018, 7 pages.
Rosen et al., "Techniques and Tools for Estimating Ionospheric Effects in Interferometric and Polarimetric SAR Data," *International Geoscience and Remote Sensing Symposium*, Vancouver, British Columbia, Canada, Jul. 24-29, 2011, pp. 1501-1504.
Rossler, "Adaptive Radar with Application to Joint Communication and Synthetic Aperture Radar (CoSAR)," doctoral dissertation, The Ohio State University, Columbus, Ohio, USA, 2013, 117 pages.
Sano et al., "Synthetic Aperture Radar (L band) and Optical Vegetation Indices for Discriminating the Brazilian Savanna Physiognomies: A Comparative Analysis," *Earth Interactions* 9(15):15, 2005. (15 pages).
Šindelář et al., "A Smartphone Application for Removing Handshake Blur and Compensating Rolling Shutter," *IEEE International Conference on Image Processing*, Paris, France, Oct. 27-30, 2014, pp. 2160-2162.
Šindelář et al., "Image deblurring in smartphone devices using built-in inertial measurement sensors," *Journal of Electronic Imaging* 22(1):011003, 2013. (22 pages).
Stofan et al., "Overview of Results of Spaceborne Imaging Radar-C, X-Band Synthetic Aperture Radar (SIR-C/X-SAR)," *IEEE Transactions on Geoscience and Remote Sensing* 33(4):817-828, 1995.
Stralka, "Applications of Orthogonal Frequency-Division Multiplexing (OFDM) to Radar," doctoral dissertaion, Johns Hopkins University, Baltimore, Maryland, USA, Mar. 2008, 196 pages.
Tyc, "Systems and Methods for Remote Sensing of the Earth From Space," U.S. Appl. No. 62/180,440, filed Jun. 16, 2015, 29 pages.
Wall et al., "User Guide to the Magellan Synthetic Aperture Radar Images," Jet Propulsion Laboratory, Pasadena, California, USA, Mar. 1995, 210 pages.
Wu et al., "Simultaneous transmit and receive polarimetric synthetic aperture radar based on digital beamforming," *4th International Conference on Mechatronics, Materials, Chemistry and Computer Engineering*, Xi'an, China, Dec. 12-13, 2015, pp. 1283-1288.
Xia et al., "Classification of High Resolution Optical and SAR Fusion Image Using Fuzzy Knowledge and Object-Oriented Paradigm," *Geographic Object-Based Image Analysis* vol. XXXVIII-4/C7, Ghent, Belgium, Jun. 29-Jul. 2, 2010, 5 pages.
China office action and search report from related case CN 201680045476.4 dated Jan. 6, 2020, with English translation.
International Preliminary Report on Patentability from related matter PCT/US2018/034144 dated Nov. 26, 2019.
International Preliminary Report on Patentability from related matter PCT/US18/34146 dated Nov. 26, 2019.
European Office Action from related application EP 16846990.6 dated Jun. 4, 2020.
European Search Report from 18806689.8 dated Oct. 1, 2020.
Mittermayer et al. "Conceptual studies for exploiting the TerraSAR-X dual receive anntenna", IEEE International Geoscience and Remove Symposium, Jul. 21, 2003.
Grafmuller, et al., "The terra-SAR-X anteanna system", IEEE International Radar Conference, May 9-12, 2005.
Gabele et al, "Comparison of Techniques for Future Spaceborne GMTA", European Conference on Synthentic Aperature Rada, Jun. 7-10, 2010.
European Search Report from 18806929.8 dated Sep. 29, 2020.

* cited by examiner

APPARATUS AND METHODS FOR SYNTHETIC APERTURE RADAR WITH DIGITAL BEAMFORMING

CROSS-REFERENCE TO RELATED APPLICATIONS

This present application is a National Phase Application Filed Under 35 U.S.C. 371 claiming priority to PCT/US2016/022841 filed Mar. 17, 2016, which in turn claims priority from U.S. Provisional Application Ser. No. 62/137,934 filed Mar. 25, 2015, the entire disclosures of which are incorporated herein by reference.

BACKGROUND

Technical Field

The present application relates generally to synthetic aperture radar (SAR) and, more particularly, to simultaneous acquisition of single and multiple polarization radar images at one or more frequency bands.

Description of the Related Art

Dual-Band SAR Payload

Synthetic aperture radar (SAR) is an imaging radar capable of generating finer spatial resolution than conventional beam-scanning radar. A SAR is typically mounted on an airborne or spaceborne platform and designed to acquire images of a terrain such as the Earth or other planets.

A single frequency SAR generates images of the terrain by transmitting radar pulses in a frequency band centered on a single frequency. For example, in the case of the RADARSAT-2 SAR, the center frequency was 5.405 GHz.

Having SAR images acquired at the same time at different frequency bands can be beneficial for remote sensing of the terrain. For example, longer wavelengths (such as L-band) propagate better through vegetation and can provide backscatter from stems or branches, or from the ground below. Shorter wavelengths (such as X-band) tend to provide more backscatter from the canopy. Simultaneous acquisition of SAR images at more than one frequency of illumination (for example, at L-band and X-band) can provide a more complete understanding of the terrain than acquisition of images at a single band.

It can also be desirable for the SAR to be capable of imaging at different polarizations (for example, single polarization and quad polarization), and in different operational modes such as ScanSAR and spotlight SAR.

Some existing SAR systems, such as the Shuttle Imaging Radar SIR-C, can operate at more than one frequency band using separate apertures. Others can operate using a shared aperture. A conventional approach to a dual-band shared-aperture multi-polarization SAR is a phased array with steering in both planes. A phased array antenna comprises an array of constituent antennas or radiating elements. Each radiating element can be fed by a signal whose phase, relative to the phase of the signal fed to the other radiating elements, can be adjusted so as to generate a desired radiation pattern for the phased array antenna.

Benefits of a phased array antenna can include flexibility in defining operational modes, reduced power density, redundancy, use of vertical beam steering for ScanSAR, zero Doppler (azimuth) steering and use of vertical beamwidth and shape control for single-beam swath width control.

A limitation of a conventional phased array SAR payload can be the complexity of the payload, for example the complexity of the harnessing, or the number and complexity of the microwave elements. Another limitation of conventional phased array SAR can be the cost associated with the constituent elements of the SAR payload, and the cost associated with integration and testing of the SAR payload.

BRIEF SUMMARY

The technology described herein addresses the aforementioned issues associated with the complexity and cost of the conventional approach to simultaneous acquisition of multi-frequency, multi-polarization SAR images using a phased array antenna. The technology comprises apparatus and methods for simultaneous acquisition of SAR images at two or more frequency bands using a SAR payload comprising a digital beamformer. The technology also applies to simultaneous acquisition of two or more channels at a single frequency band.

Other benefits of the digital beamforming technology can include reduced numbers of microwave components, reduced unit and integration costs, reduced program cost and risk, improved stability, calibration and radiometric accuracy, increased reliability and greater beam agility.

A key issue with digital beamforming is the number of channels that have to be digitized with one or more analog-to-digital converters (ADCs) prior to beamforming. There are two aspects to this: a) power consumption and b) high data rates from the one or more ADCs. The high data rates require a large number of data paths which, in turn, require a large number of digital data receivers. This further increases the complexity and power consumption of the SAR system.

The technology described herein comprises an aspect in which a single ADC can be used to digitize the radar signals at the one or more frequency bands of the SAR. For example, in a dual-band SAR at L-band and X-band, a single ADC can be used for both L-band and X-band signals. A frequency division multiplexing technique can be used to combine signals at more than one frequency band to produce a single signal for input to the ADC.

In a single frequency SAR, a frequency division multiplexing technique can be used to combine multiple channels to produce a single signal for input to the ADC. For example, if each channel has a bandwidth of 100 MHz and the ADC has a bandwidth of 500 MHz, then four channels can be combined (with guard bands) to produce a single signal for input to the ADC.

A method of operation of a digital beamforming synthetic aperture radar (SAR) may be summarized as including receiving a first analog signal having a first center frequency and a first bandwidth; receiving a second analog signal having a second center frequency and a second bandwidth; mixing the first analog signal with a first local oscillator signal by at least one mixer to shift the first center frequency to a first intermediate frequency to generate a frequency-shifted first signal having a first spectral band; mixing the second analog signal with a second local oscillator signal by at least one mixer to shift the second center frequency to a second intermediate frequency to generate a frequency-shifted second signal having a second spectral band, the second spectral band of the second frequency-shifted signal positioned at a defined frequency offset from the first spectral band of the first frequency-shifted signal, and the second spectral band of the second frequency-shifted signal positioned non-overlapping with the first spectral band of the first frequency-shifted signal; combining the first and the second frequency-shifted signals by at least one combiner to generate a combined analog receive signal; band-pass sampling the combined analog receive signal by an analog-to-digital converter having an input bandwidth to generate a digital baseband signal comprising digital signal data representative of the first analog signal and digital signal data representative of the second analog signal.

The method may further include mixing the digital baseband signal with a third local oscillator signal by at least one digital mixer to extract the digital signal data representative of the first analog signal; and mixing the digital baseband signal with a fourth local oscillator signal by at least one digital mixer to extract the digital signal data representative of the second analog signal. Receiving a second analog signal may include receiving the second analog signal concurrently with receiving the first analog signal. Receiving a second analog signal having a second center frequency and a second bandwidth may include receiving the second analog signal having the second center frequency which is different from the first center frequency of the first analog signal. Receiving a first analog signal having a first center frequency and a first bandwidth may include receiving the first analog signal on a first channel, and receiving a second analog signal having a second center frequency and a second bandwidth may include receiving the second analog signal on a second channel, the second channel different from the first channel, and the second center frequency of the second analog signal equal to the first center frequency of the first analog signal. The first analog signal with a first local oscillator signal by at least one mixer may include mixing the first analog signal with the first local oscillator signal to position the first spectral band in the Nyquist bandwidth after band-pass sampling the combined analog receive signal by an analog-to-digital converter, and mixing the second analog signal with a second local oscillator signal by at least one mixer may include mixing the second analog signal with the second local oscillator signal to position the second spectral band in the Nyquist bandwidth, and non-overlapping with the first spectral band, after band-pass sampling the combined analog receive signal by an analog-to-digital converter.

The method may further include receiving a third analog signal having a third center frequency and a third bandwidth; mixing the third analog signal with a third local oscillator signal by at least one mixer to shift the third center frequency to a the intermediate frequency to generate a frequency-shifted third signal having a third spectral band. Combining the first and the second frequency-shifted signals by at least one combiner to generate a combined analog receive signal may include combining the first and the second frequency-shifted signals by the at least one combiner to generate the combined analog receive signal having a bandwidth that is less than the input bandwidth of the analog-to-digital converter which performs the band-pass sampling of the combined analog receive signal. Combining the first and the second frequency-shifted signals by at least one combiner to generate a combined analog receive signal and sampling the combined analog receive signal by an analog-to-digital converter to generate a digital baseband signal may include combining the first and the second frequency-shifted signals by the at least one combiner to generate the combined analog receive signal and sampling the combined analog receive signal by an analog-to-digital converter to generate a digital baseband signal having: i) a first guard band between a high frequency cut-off of the Nyquist bandwidth and the first spectral band of the first frequency-shifted signal, the first guard band having a width that exceeds a defined first width threshold; ii) a second guard band between the first spectral band of the first frequency-shifted signal and the second spectral band of the second frequency-shifted signal, the second guard band having a width that exceeds a defined second width threshold; iii) a third guard band between the second spectral band of the second frequency-shifted signal and a low frequency cut-off of the Nyquist bandwidth, the third guard band having a width that exceeds a defined third width threshold, and the digital baseband signal having a bandwidth that is less than the input bandwidth of the analog-to-digital converter which performs the sampling of the combined analog receive signal.

The method may further include selecting at least one of: the first and the second center frequencies, the first and the second bandwidths, the first and the second intermediate frequencies, the first, the second, and the third guard bands or a sampling frequency of the analog-to-digital converter to ensure that a measure of spectral purity is greater than a defined spectral purity threshold. The measure of spectral purity may be related to a spurious free dynamic range. At least one of the mixing the first analog signal with a first local oscillator signal or the mixing the second analog signal with the second oscillator signal may include down converting the first or second analog signal. At least one of the mixing the first analog signal with a first local oscillator signal or the mixing the second analog signal with the second oscillator signal may include up converting the first or second analog signal. At least one of the mixing the first analog signal with a first local oscillator signal or the mixing the second analog signal with the second oscillator signal may include up converting one of the first or second analog signals and down converting the other one of the first of the second analog signals.

A digital beamforming synthetic aperture radar (SAR) receiver subsystem may be summarized as including a first transceiver communicatively coupled to at least one antenna element to receive a first analog signal having a first center frequency and a first bandwidth; a second transceiver communicatively coupled to at least one antenna element to receive a second analog signal having a second center frequency and a second bandwidth; a frequency divisional multiplexer communicatively coupled to the first and the second transceivers and which converts the first and the second analog signals to a first and a second frequency-shifted signal, respectively, the first-frequency shifted signal having a first spectral band, and the second-frequency shifted signal having a second spectral band, the second spectral band of the second frequency-shifted signal positioned at a defined frequency offset from the first spectral band of the first frequency-shifted signal, and the frequency divisional multiplexer comprising a combiner that combines the first and the second frequency-shifted signals to generate a combined analog receive signal; an analog-to-digital converter communicatively coupled to receive the combined analog receive signal and which band-pass samples the combined analog receive signal to generate a digital baseband signal comprising digital signal data representative of the first analog signal and digital signal data representative of the second analog signal, wherein the spectral band of the digital signal data representative of the first analog signal is non-overlapping with the spectral band of the digital signal data representative of the second analog signal.

Frequency divisional multiplexer may further include a first mixer communicatively coupled to receive a first local oscillator signal and the first analog signal, and which mixes the first analog signal with the first local oscillator signal to shift the first center frequency to a first intermediate frequency to generate the frequency-shifted first signal having the first spectral band; a second mixer communicatively coupled to receive a second local oscillator signal and the second analog signal, and which mixes the second analog signal with the second local oscillator signal to shift the second center frequency to the second intermediate frequency to generate the frequency-shifted second signal having the second spectral band. The first mixer may mix the first analog signal with the first local oscillator signal to shift the first center frequency to generate the frequency-shifted first signal having the first spectral band in the Nyquist bandwidth after band-pass sampling the combined analog receive signal by the analog-to-digital converter, and the second mixer may mix the second analog signal with the second local oscillator signal to shift the second center frequency to generate the frequency-shifted second signal having the second spectral band in the Nyquist bandwidth after band-pass sampling the combined analog receive signal by the analog-to-digital converter, and non-overlapping with the first spectral band in the Nyquist bandwidth.

The digital beamforming synthetic aperture radar (SAR) receiver subsystem may further include a second transceiver communicatively coupled to at least one antenna element to receive a third analog signal having a third center frequency and a third bandwidth, and wherein the frequency divisional multiplexer is communicatively coupled to the third transceiver and converts the third analog signal to a third frequency-shifted signal having a third spectral band.

The digital beamforming synthetic aperture radar (SAR) receiver subsystem may further include a digital processing unit which comprises: a first digital processing unit mixer communicatively coupled to the analog-to-digital converter and which mixes the digital baseband signal with a third local oscillator signal to extract the digital signal data representative of the first analog signal; and a second digital processing unit mixer communicatively coupled to the analog-to-digital converter having an input bandwidth and which mixes the digital baseband signal with a fourth local oscillator signal to extract the digital signal data representative of the second analog signal. The first and the second transceivers may concurrently receive the first and the second analog signals, respectively. The second transceiver may receive the second analog signal having the second center frequency which may be different from the first center frequency of the first analog signal received by the first transceiver. The first transceiver may receive the first analog signal on a first channel, and the second transceiver may receive the second analog signal on a second channel, the second channel different from the first channel, and the second center frequency of the second analog signal equal to the first center frequency of the first analog signal. The combiner may combine the first and the second frequency-shifted signals to generate the combined analog receive signal having a bandwidth that is less than the input bandwidth of the analog-to-digital converter which performs the sampling of the combined analog receive signal. The combiner may combine the first and the second frequency-shifted signals to generate the combined analog receive signal and the analog-to-digital converter samples the combined analog receive signal to generate a digital baseband signal having: i) a first guard band between a high frequency cut-off of the Nyquist bandwidth and the first spectral band of the first frequency-shifted signal, the first guard band having a width that exceeds a defined first width threshold; ii) a second guard band between the first spectral band of the first frequency-shifted signal and the second spectral band of the second frequency-shifted signal, the second guard band having a width that exceeds a defined second width threshold; iii) a third guard band between the second spectral band of the second frequency-shifted signal and a low frequency cut-off of the Nyquist bandwidth, the third guard band having a width that exceeds a defined third width threshold, and the combined analog receive signal has a bandwidth that is less than the input bandwidth of the analog-to-digital converter which performs the sampling of the combined analog receive signal. The frequency divisional multiplexer may include at least one down converter that down converts at least one of the first or second analog signals. The frequency divisional multiplexer may include at least one up converter that up converts at least one of the first or second analog signals. The frequency divisional multiplexer may include at least one up converter that up converts at least one of the first or second analog signals, and at least one down converter that down converts the other one of the first or second analog signals.

DETAILED DESCRIPTION

Conventional Phased Array SAR Payload (Prior Art)

Figure 1A:
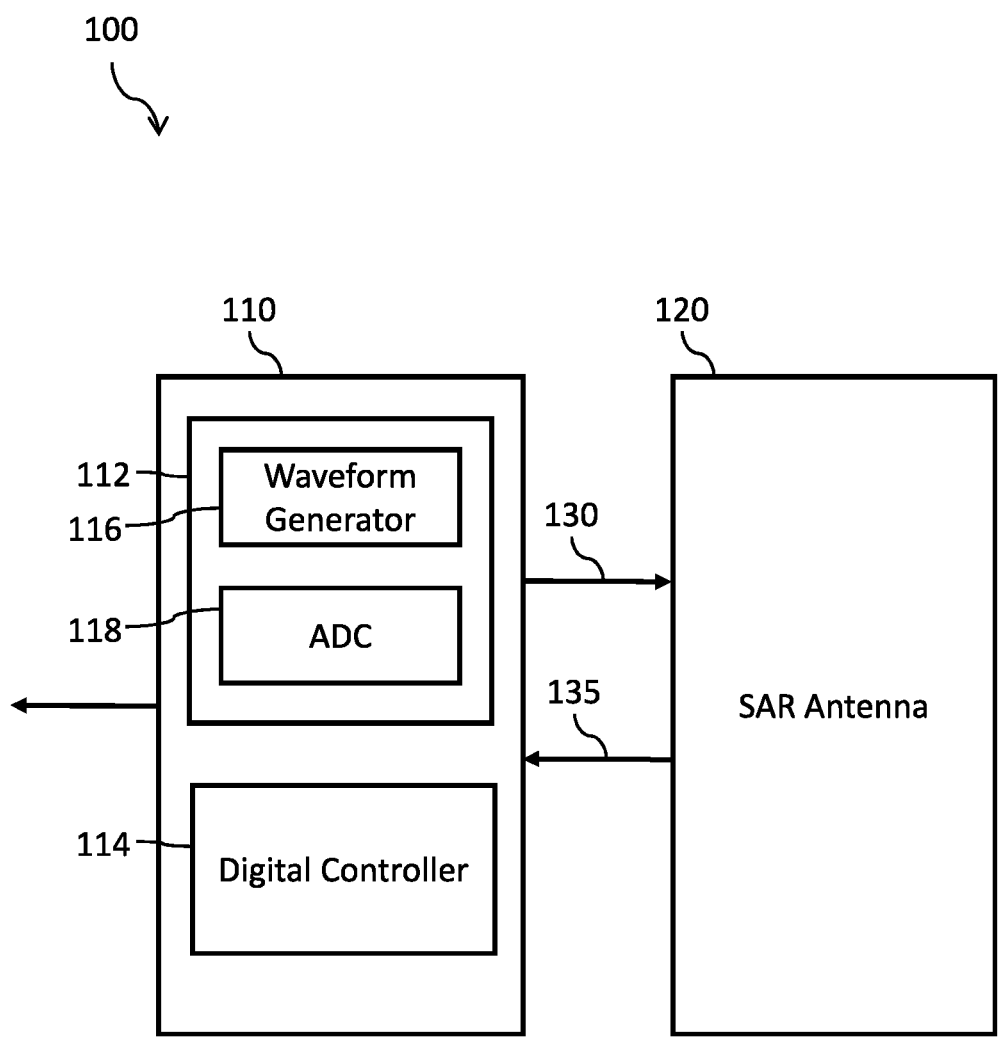
FIG. 1A is a block diagram illustrating an embodiment of a conventional Synthetic Aperture Radar (SAR) payload.

FIG. 1A is a block diagram illustrating an embodiment of a conventional Synthetic Aperture Radar (SAR) payload 100. SAR payload 100 can, for example, be a dual-band, multi-polarization SAR payload. SAR payload 100 can be hosted by a spaceborne platform such as the International Space Station (ISS) or an Earth-orbiting satellite.

SAR payload 100 comprises a Receiver/Exciter Unit (REU) 110 and a SAR antenna 120. REU 110 generates radar signals for transmission by SAR payload 100. It also converts the received or returned radar signals into digital data. REU 110 comprises an analog subsystem 112 and a digital controller 114. Analog subsystem 112 comprises a waveform generator 116 on the transmit path, and an Analog to Digital Converter (ADC) 118 on the receive path.

SAR payload 100 further comprises interfaces 130 and 135 between REU 110 and SAR antenna 120. Interfaces 130 and 135 can comprise microwave interfaces to SAR antenna 120.

SAR antenna 120 can be a phased array. A conventional phased array antenna typically comprises a large number of radiating elements grouped as subarrays. Each subarray typically comprises a Transmit/Receive Module (TRM).

ADC 118 can digitize a beam, the beam formed in SAR antenna 120 by summation in a splitter/combiner of phase and amplitude adjusted received signals. A limitation is that the splitter/combiner can introduce phase and amplitude errors owing to variations in performance with temperature, frequency and time.

Since to form more than one beam, the number of TRMs has to be multiplied by the number of beams, it can be challenging to implement a multi-beam SAR within the limitations imposed by mass and power constraints of the host platform (e.g. a spacecraft).

It can be desirable to replace the analog elements of REU 110 by digital components for reasons of performance, cost, and flexibility.

Figure 1B:
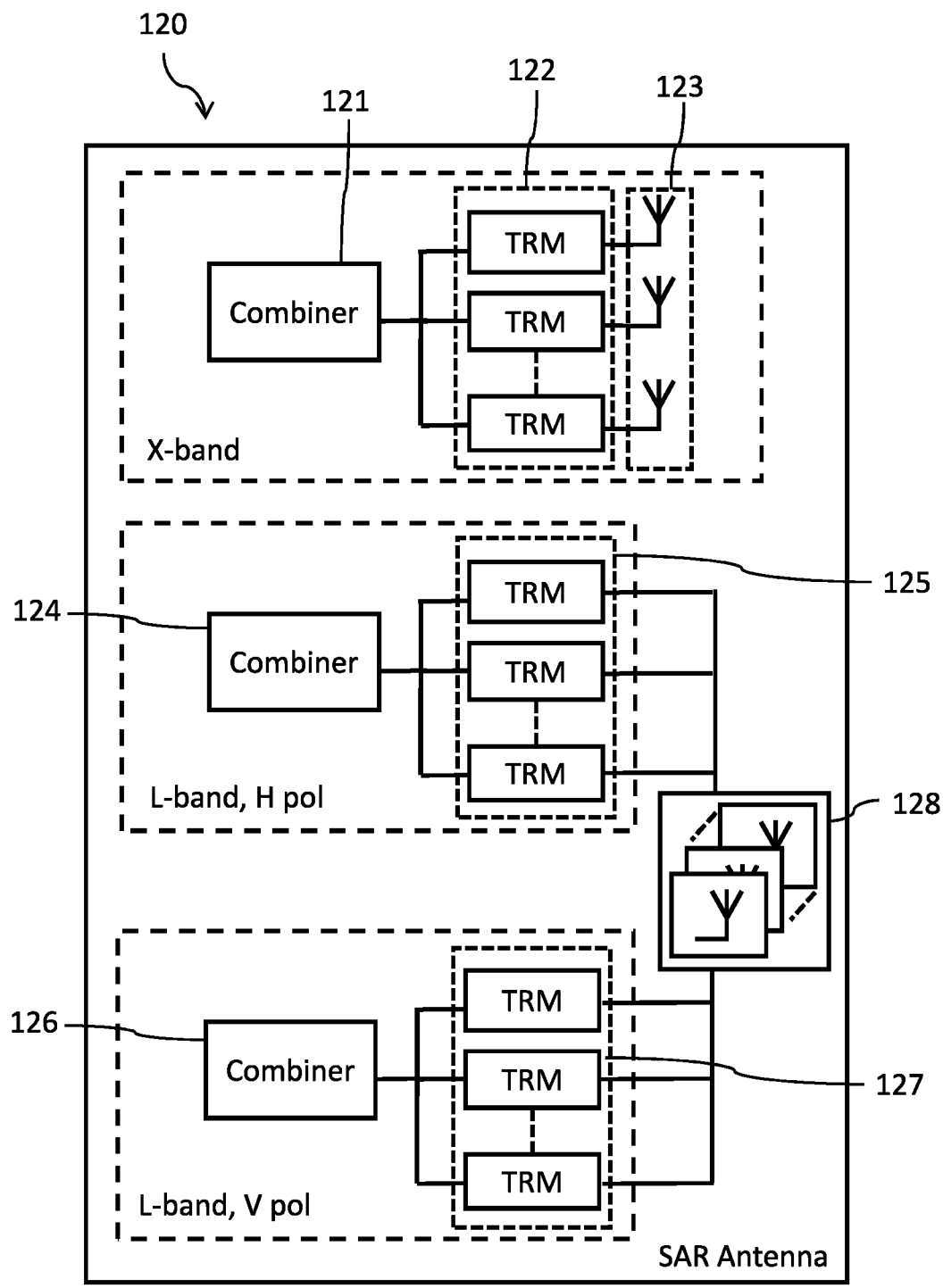
FIG. 1B is a block diagram illustrating an embodiment of the SAR antenna of FIG. 1A.

FIG. 1B is a block diagram illustrating an embodiment of SAR antenna 120 of FIG. 1A. In the example shown, SAR antenna 120 comprises three channels—an X-band channel, an L-band horizontally (H) polarized channel and an L-B and vertically (V) polarized channel.

Referring to FIG. 1B, SAR antenna 120 comprises an X-band channel comprising a splitter/combiner 121, a set of TRMs 122 and a corresponding set of radiating X-band subarrays 123. SAR antenna 120 further comprises an L-band H-polarized channel comprising a splitter/combiner 124 and a set of TRMs 125, and an L-band V-polarized channel comprising a splitter/combiner 126 and a set of TRMs 127. SAR antenna 120 further comprises a corresponding set of radiating L-band subarrays 128.

Figure 1C:
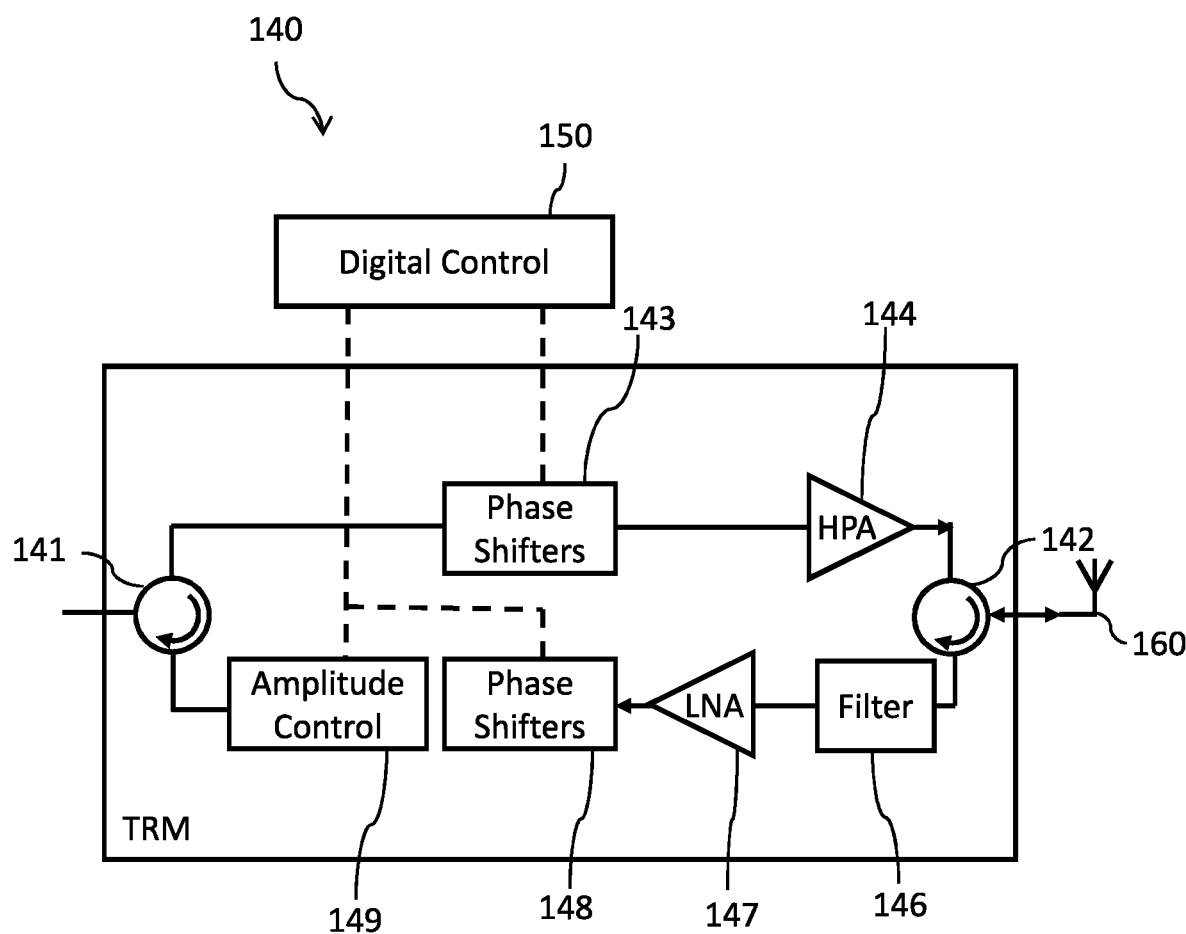
FIG. 1C is a block diagram illustrating a Transmit/Receive Module (TRM) for a conventional SAR payload such as the SAR payload of FIG. 1A.

FIG. 1C is a block diagram illustrating a TRM 140 for a conventional SAR payload such as SAR payload 100 of FIG. 1A. TRM 140 comprises circulators 141 and 142, a first set of digitally controlled phase shifters 143, a high power amplifier (HPA) 144, filter 146, a low noise amplifier (LNA) 147, a second set of phase shifters 148, a digitally controlled amplitude gain control 149 and a digital controller 150.

Circulator 142 can be connected to a subarray of radiating elements 160.

Limitations of the first and second set of phase shifters 143 and 148, and amplitude gain control 149, can include a) limited precision (owing to the limited number of bits used in typical implementations), and b) variations with temperature, frequency and time (owing to variations in the performance of analog components).

It can be desirable to replace the digitally controlled analog phase shifters and amplitude gain control by a "digital antenna" with phase shifters and amplitude control implemented on a digital device such as an Field Programmable Gate Array (FPGA), an Application Specific Integrated Circuit (ASIC) or a microprocessor on a Digital Signal Processing (DSP) chip.

Digital Antenna

Figure 2:
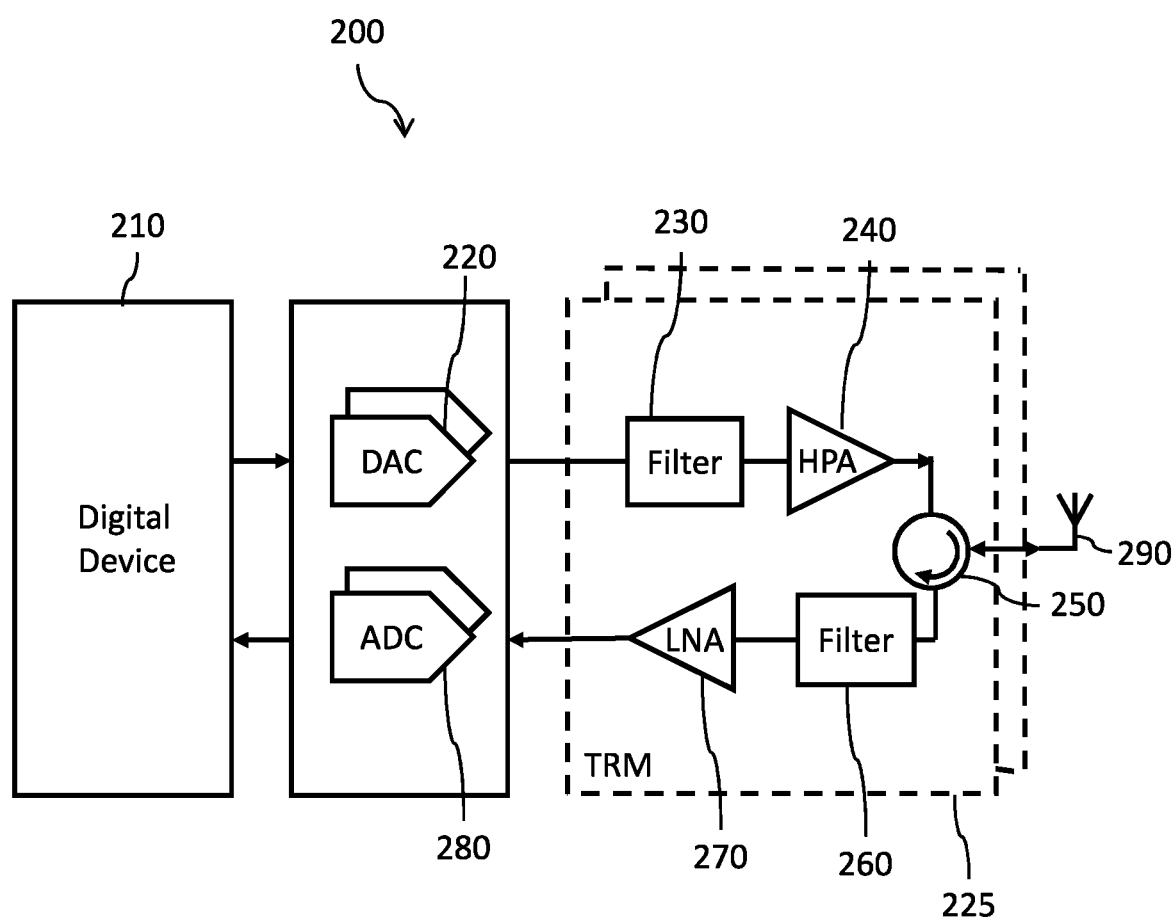
FIG. 2 is a block diagram illustrating an embodiment of a digital antenna.

FIG. 2 is a block diagram illustrating an embodiment of a digital antenna 200. Digital antenna 200 comprises a digital device 210, one or more digital to analog converters (DAC) 220, one or more transmit/receive modules 225, each comprising a filter 230, a HPA 240, a circulator 250, a filter 260, a LNA 270, and one or more analog to digital converters (ADC) 280. Circulator 250 can be connected to a subarray of radiating elements 290.

Digital device 210 can implement digital phase shifters and digital amplitude gain control. Digital device 210 can also apply beamforming coefficients on both transmit and receive.

A challenge in the implementation of digital antenna 200 can be the high rates across the interface between digital device 210 and DAC 220, and the interface between ADC 280 and digital device 210.

For example, an 8-bit ADC at a data rate of 500 megasamples per second can require up to 8 differential connections occupying up to 16 digital receivers on a field-programmable gate array (FPGA). While FPGAs can have high speed digital receivers, the limiting factor can be the number of digital receivers per FPGA.

Digital Antenna with Frequency Domain Multiplexing

The presently described technology is based on digital beamforming with frequency domain multiplexing. Like existing digital beamformers, the presently described technology can eliminate or reduce the need for one or more components of the SAR payload in the conventional approach (for example, SAR payload 100 of FIG. 1A) thereby simplifying the SAR payload and reducing cost and/or complexity.

The presently described technology can be implemented with fewer ADCs and with fewer FPGAs than existing approaches, thereby reducing the cost and complexity of the digital beamforming SAR. The use of frequency domain multiplexing as described below increases the data that can be passed to each digital receiver by making greater use of the available bandwidth. In this manner, the number of FPGAs required can be reduced, with a concomitant reduction in cost, complexity and required power.

Figure 3:
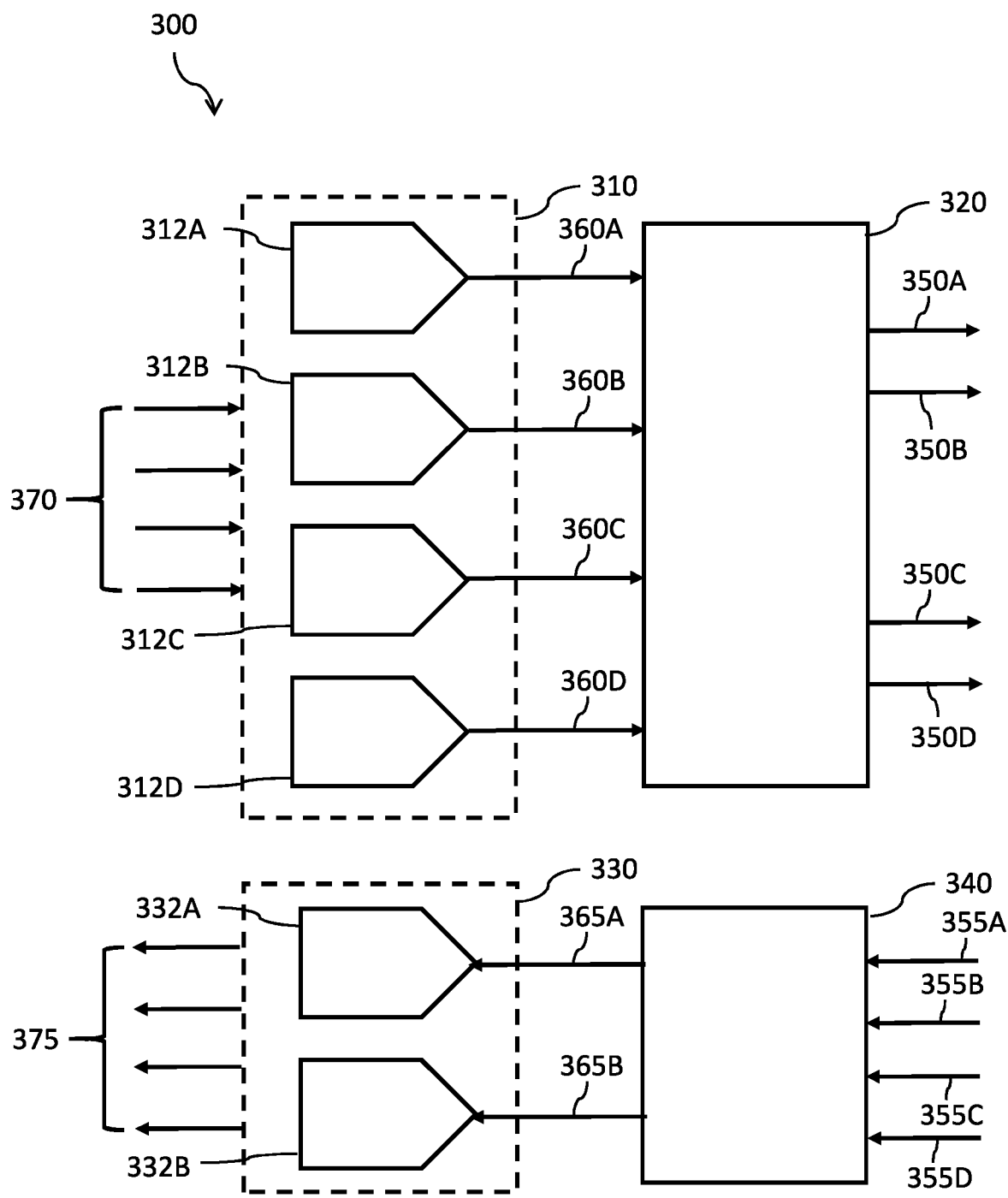
FIG. 3 is a block diagram of an embodiment of a dual-band multi-polarization transceiver.

FIG. 3 is a block diagram of an embodiment of a dual-band multi-polarization transceiver 300. Transceiver 300 comprises an array 310 of digital-to-analog converters (DACs), a four-channel transmit module 320, an array 330 of analog-to-digital converters (ADCs), and a four channel receive module 340.

Array 310 comprises four digital-to-analog converters (DACs) 312A through 312D, and array 330 comprises two analog-to-digital converters (ADCs) 332A and 332B. Transmit module 320 comprises a four-channel transmitter. Receive module 340 comprises a four-channel multi-frequency FDM multiplexer.

Transceiver 300 provides four transmit pulse outputs 350A through 350D, and four receive channel inputs 355A through 355D. In one embodiment, the SAR is a dual X- and L-Band SAR with quad-pol capability at L-band. Two of the four transmit channels 350A and 350C can be allocated to L-band—one to vertically polarized transmit pulses and the other to horizontally polarized transmit pulses. The remaining two of the four transmit channels 350B and 350D can be allocated to X-band transmit pulses. Since, in the example embodiment described, there are twice as many rows of radiating elements for X-band as there are for L-band, channels 350B and 350D can be allocated to the $n^{th}$ and $(n+1)^{th}$ row of X-band radiating elements respectively.

Two of the four receive channels 355A and 355C can be correspondingly allocated to L-band—one to vertically polarized receive pulses and the other to horizontally polarized receive pulses. The remaining two receive channels 355B and 355D can be allocated to X-band receive pulses.

In an example, an array of fourteen transceivers—each transceiver being an instance of transceiver 300—can provide fifty-six transmit channels and fifty-six receive channels.

An interface between array 310 and transmit module 320 can comprise four analog channels 360A, 360B, 360C and 360D.

An interface between array 330 and receive module 340 can comprise two channels 365A and 365B. Channels 355A and 355B can be multiplexed using FDM into a single channel 365A for input to ADC 332A. Similarly, channels 355C and 355D can be multiplexed using FDM into a single channel 365B for input to ADC 332B.

Transceiver 300 comprises four input lanes 370 to array 310, and four output lanes 375 from array 330. In an example embodiment, input lanes 370 and output lanes 375 can transfer digital data at a rate of approximately 10 Gbits per second.

Figure 4:
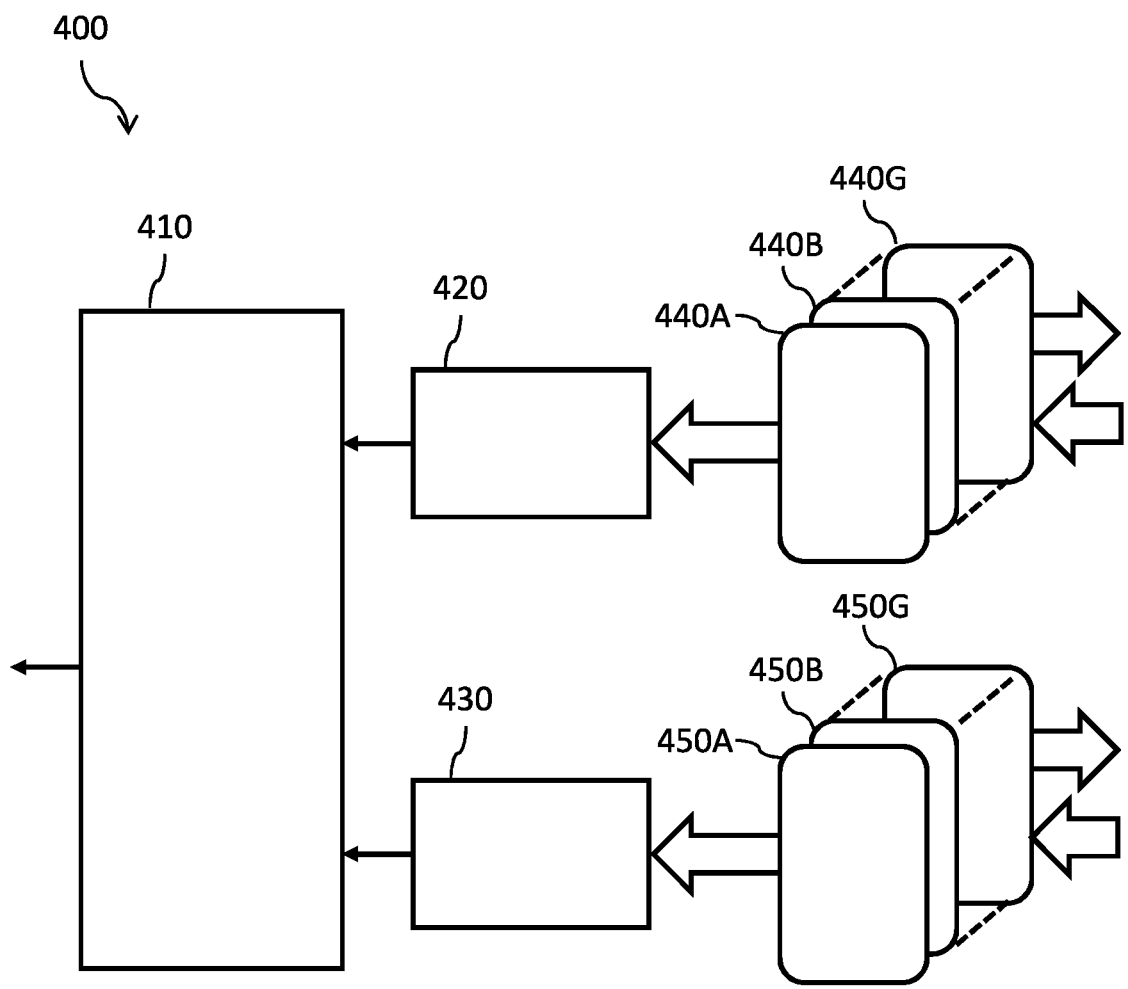
FIG. 4 is a block diagram of an embodiment of a dual-band multi-polarization receiving subsystem.

FIG. 4 is a block diagram of an embodiment of a dual-band multi-polarization transmit/receive subsystem 400. Transmit/receive subsystem 400 transforms digital data to transmit pulses, and multi-frequency radar returns received by an antenna to digital data. Transmit/receive subsystem 400 comprises a SAR controller 410, field-programmable gate arrays (FPGAs) 420 and 430, and fourteen transceivers 440A through 440G and 450A through 450G.

In other embodiments, the number and configuration of FPGAs and transceivers can be varied to meet the requirements of the SAR payload.

In an example embodiment, SAR controller 410 can be implemented using system-on-a-chip (SoC) technology such as the Xilinx Zync-7000 platform. FPGAs 420 and 430 can be implemented using devices such as the Xilinx Virtex-7 (XC7VX690T).

Each transceiver of transceivers 440A through 440G and 450A through 450G can be an instance of transceiver 200 of FIG. 2. As described above, transceiver 200 provides four transmit and four receive channels. The seven transceivers 440A through 440G combined can provide twenty-eight transmit channels. Similarly, the seven transceivers 450A through 450G combined can provide twenty-eight transmit channels. It follows that transmit/receive subsystem 400 can provide a total of fifty-six transmit channels and fifty-six receive channels.

Figure 5:
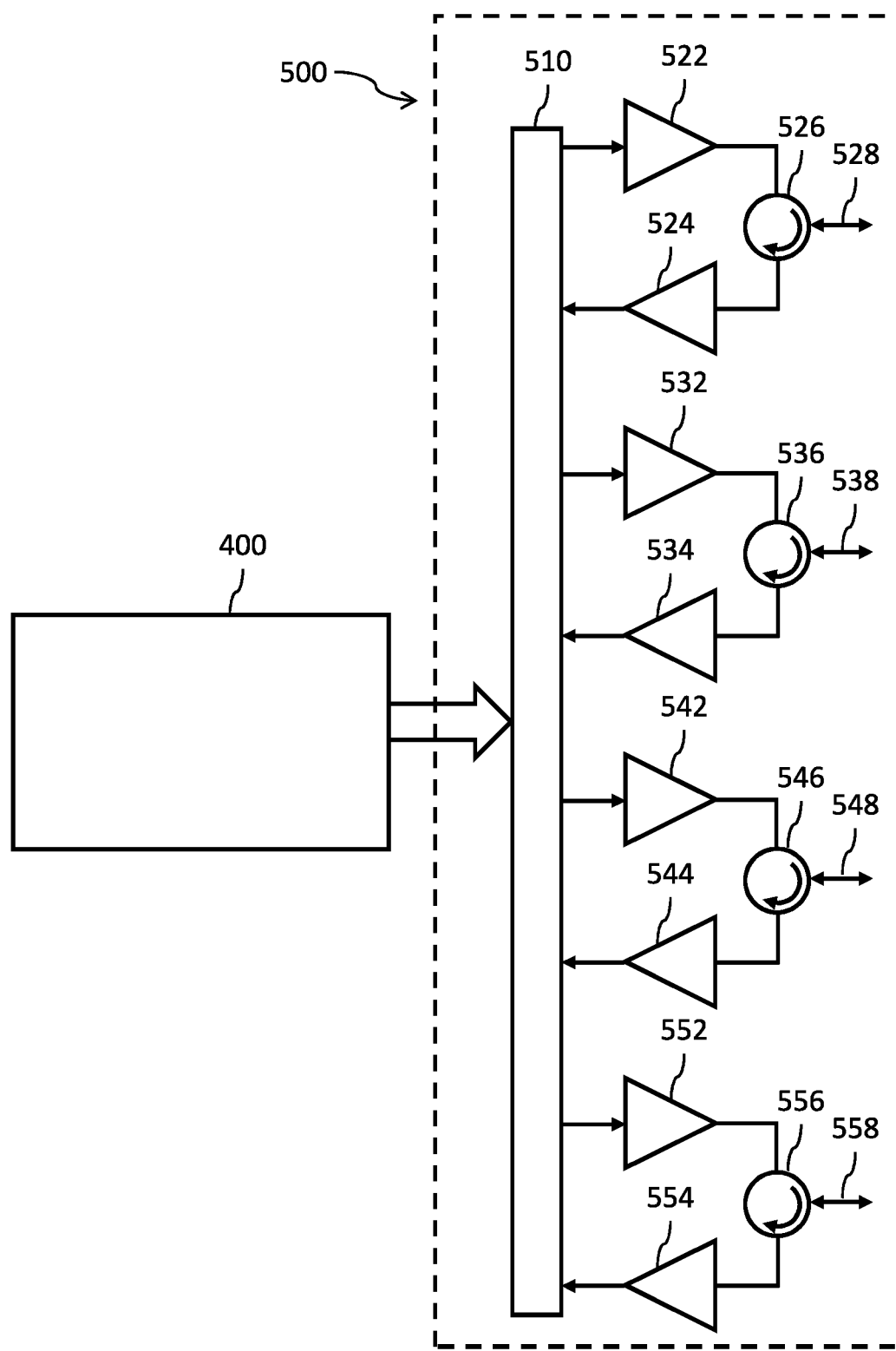
FIG. 5 is a block diagram illustrating an embodiment of an antenna subsystem.

FIG. 5 is a block diagram illustrating an embodiment of an antenna subsystem 500. Antenna subsystem 500 can be coupled to transmit/receive subsystem 400 of FIG. 4. Antenna subsystem 500 comprises an antenna interface 510 to transmit/receive subsystem 400. In the example embodiment described above, transmit/receive subsystem 400 can provide a total of fifty-six transmit channels and fifty-six receive channels. For the same example embodiment of the SAR payload, antenna interface 510 comprises 112 coaxial cables—one cable for each of the transmit and receive channels. In another implementation, the transmit and receive channels can be switched.

For the example embodiment of a four-channel antenna subarray, antenna subsystem 500 further comprises four high-power amplifiers (HPAs) 522, 532, 542 and 552, four low noise amplifiers (LNAs) 524, 534, 544 and 554, four three-port circulators 526, 536, 546 and 556, and four coaxial interfaces 528, 538, 548 and 558 to the antenna feed and patches.

Figure 6:
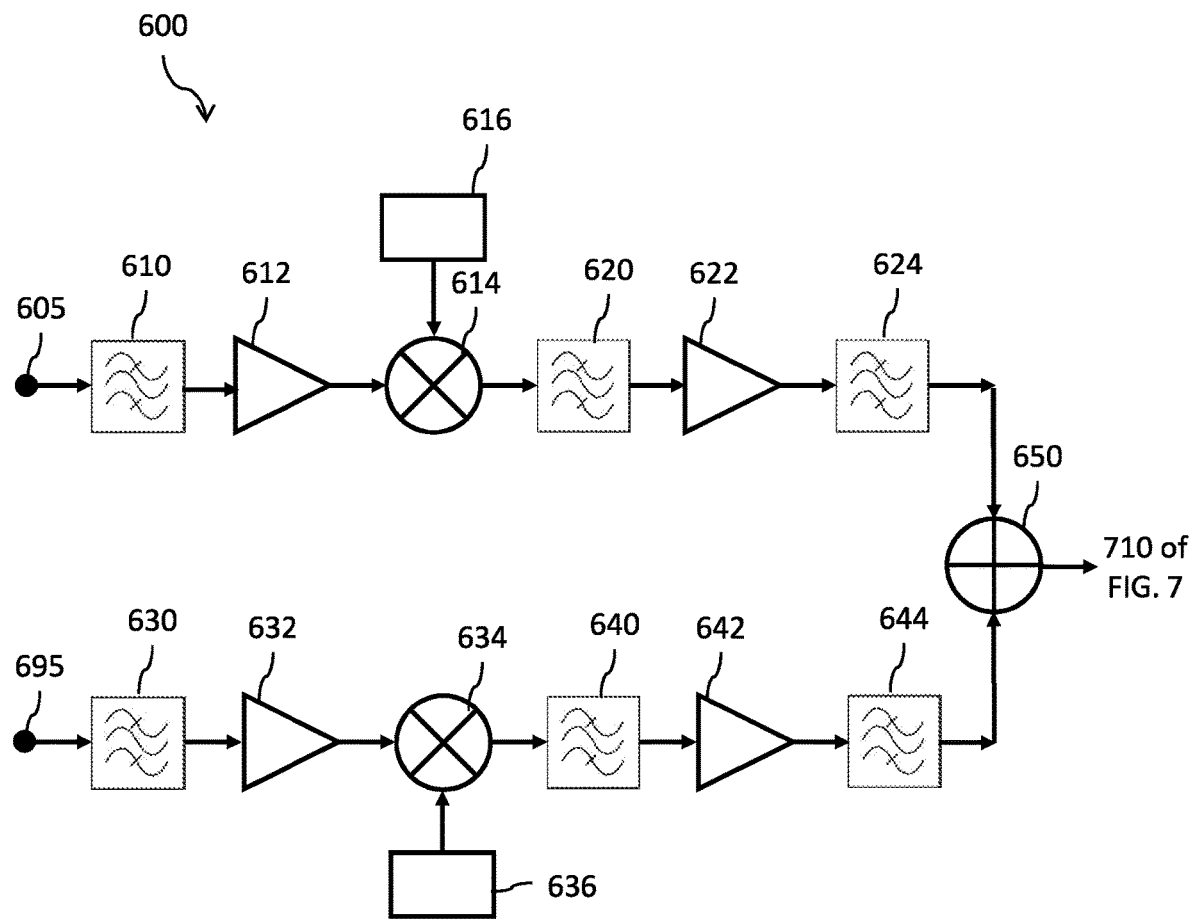
FIG. 6 is a schematic illustrating an embodiment of a frequency division multiplexing (FDM) multiplexer for a dual-band transceiver.

FIG. 6 is a schematic illustrating an embodiment of a frequency division multiplexing (FDM) multiplexer 600 for a dual-band transceiver. FIG. 6 illustrates the frequency division multiplexing of signals at two frequency bands into a single combined signal. A benefit of using FDM to generate a single combined signal is that the combined signal can be digitized using a single ADC rather than two separate ADCs, one for each band.

Referring to FIG. 6, a first received signal from a first band (such as X-band, for example) is fed into multiplexer 600 at node 605. The first received signal is band-pass filtered by an image rejection filter 610 and passed via a buffer/amplifier 612 to a mixer 614 where it is mixed with a signal at a down-conversion frequency generated by a local oscillator 616. The result is the first received signal centered at a first intermediate frequency.

The first received signal (now at the first intermediate frequency) is passed through a band-pass filter 620, a buffer/amplifier 622 and (optionally) another band-pass filter 624 before being passed to a combiner 650.

Similarly, a second received signal from a second band (such as L-band, for example) is fed into multiplexer 600 at node 695. The second received signal is band-pass filtered by an image rejection filter 630 and passed via a buffer/amplifier 632 to a mixer 634 where it is mixed with a signal at a down-conversion frequency generated by a local oscillator 636. The result is the second received signal centered at a second intermediate frequency.

The second received signal (now at the second intermediate frequency) is passed through a band-pass filter 640, a buffer/amplifier 642 and (optionally) another band-pass filter 644 before being passed to combiner 650.

While, in the above description, the example embodiment illustrated in FIG. 6 mixes the first received signal with a signal at a down-conversion frequency and the second received signal with a signal also at a down-conversion frequency, other example embodiments can use another suitable combination of down- and up-conversion frequencies. More generally, with reference to FIG. 6, local oscillators 616 and 636 can each generate signals at a down- or an up-conversion frequency relative to the center frequencies of the received signals.

Figure 7:
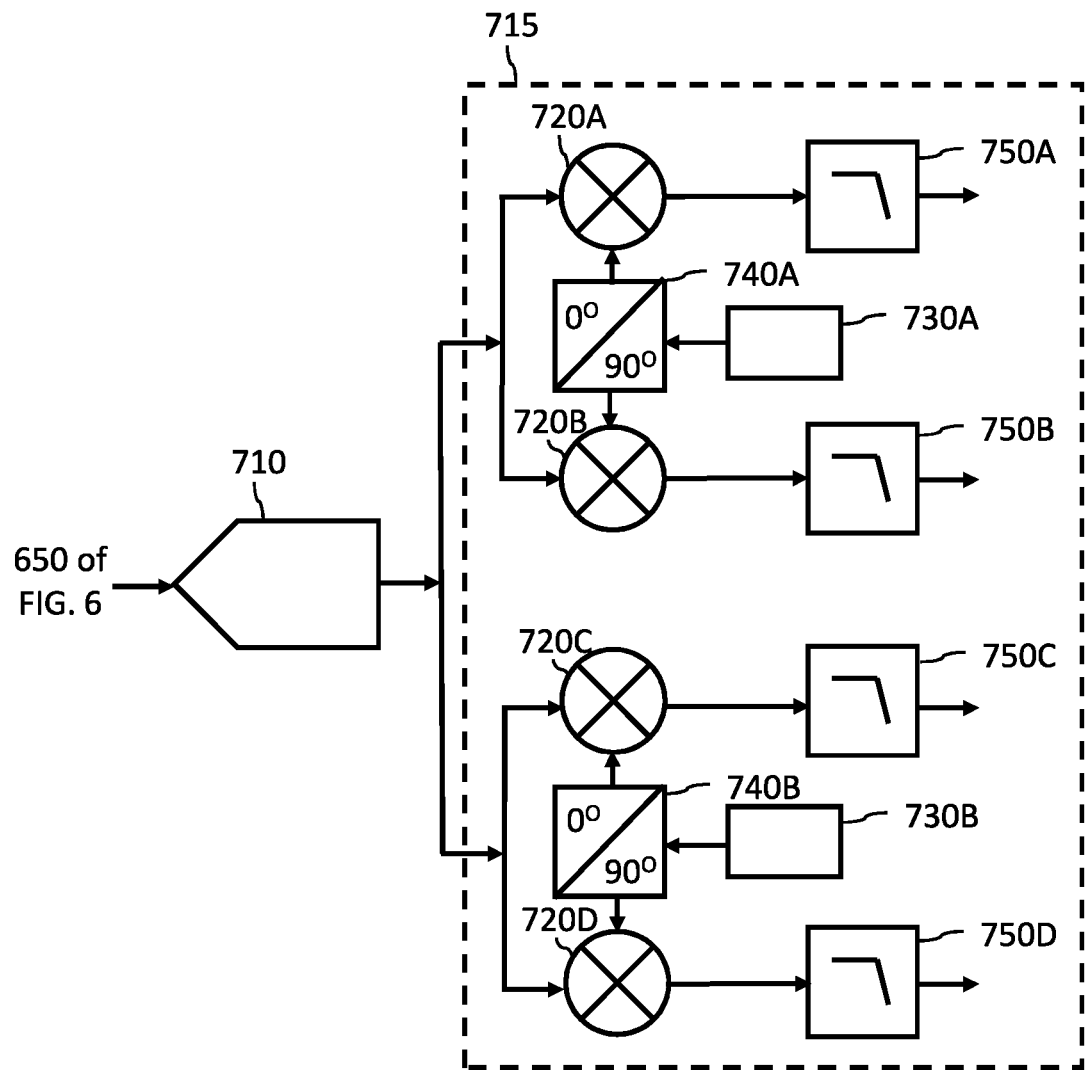
FIG. 7 is a schematic illustrating an embodiment of an ADC and a digital processing unit for a dual-band transceiver.

FIG. 7 is a schematic illustrating an embodiment of an ADC 710 and a digital processing unit 715 for a dual-band receiver. The combined signal from combiner 650 of FIG. 6 is fed into the input of ADC 710. In an example embodiment, the combined signal comprises an X-band signal at an intermediate frequency of 1,690 MHz with a bandwidth of 350 MHz, and an L-band signal at an intermediate frequency of 940 MHz with a bandwidth of 85 MHz.

ADC 710 band-pass samples the combined analog signal. In an example embodiment, ADC has a sampling frequency of 1 GHz. The effect of band-pass sampling (or sub-sampling as it can also be known) is to produce an aliased spectrum at baseband. The method is described in more detail with reference to the plots of FIGS. 8A through 8D, and the flow chart of FIG. 9.

Digital processing unit 715 comprises mixers 720A through 720D, signal generators 730A and 730B, phase shifters 740A and 740B, and low-pass filters 750A through 750D. Digital processing unit 715 can be implemented using an FPGA or other suitable digital processing elements.

Figure 8A:
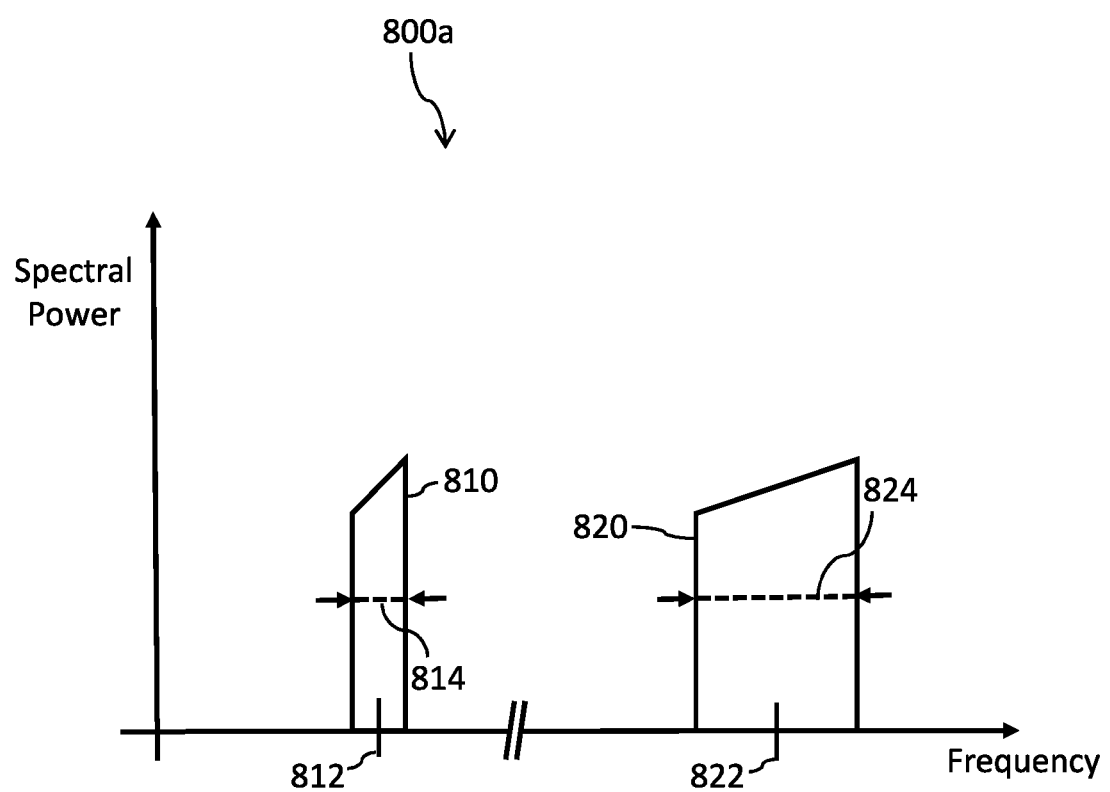
FIG. 8A is an exemplary simplified plot of spectral power distribution of transmitted bandwidths for a dual-band SAR.

FIG. 8A is an exemplary simplified plot 800a of spectral power distribution of transmitted and received bandwidths for a dual-band SAR. The two SAR bands are shown on the same plot. A first band 810 has center frequency 812 and bandwidth 814. A second band 820 has center frequency 822 and bandwidth 824.

In one embodiment, two radar bands are X-band and L-band. The X-band center frequency can be 9.6 GHz and the X-band bandwidth can be 350 MHz. The L-band center frequency can be 1.2575 GHz and the L-band bandwidth can be 85 MHz.

Figure 8B:
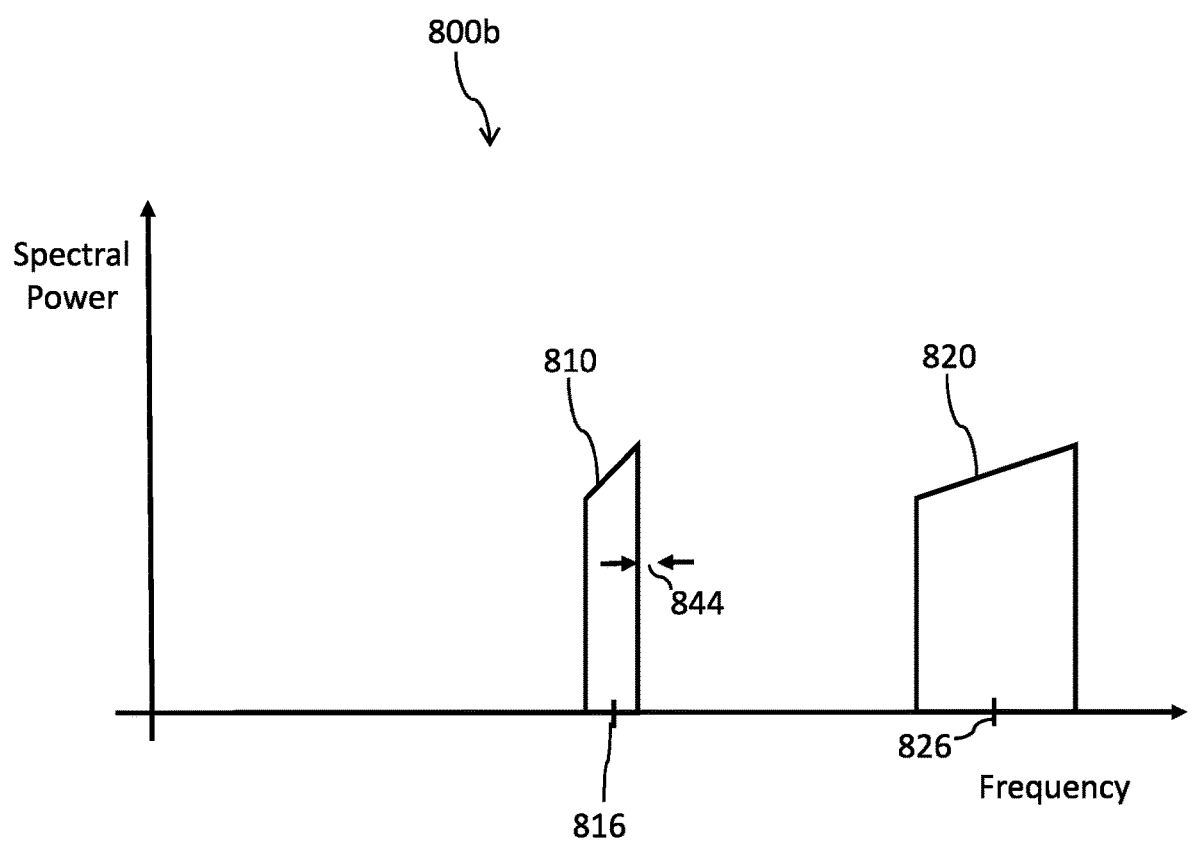
FIG. 8B is an exemplary simplified plot of spectral power distribution of received bandwidths for a dual-band SAR after frequency division multiplexing of the two SAR frequency bands.

FIG. 8B is an exemplary simplified plot 800b of spectral power distribution of received bandwidths for a dual-band SAR after frequency division multiplexing of the two SAR frequency bands. FIG. 8B illustrates the result of mixing the received signals to intermediate frequencies to occupy adjacent sub-bands within the bandwidth of an ADC.

The first band 810 has been mixed to a first intermediate frequency 816. The received signals in the first band have been mixed with a signal at a down-conversion frequency (not shown in FIG. 8B) equal to the difference between the first center frequency 812 and the first intermediate frequency 816. The second band 820 has been mixed to a second intermediate frequency 826. The received signals in the second band have been mixed with a signal at a down-conversion frequency (not shown in FIG. 8B) equal to the difference between the second center frequency 822 and the second intermediate frequency 826.

The down-conversion frequencies can be selected to position the first and second bands 810 and 820 with guard bands (not shown in FIG. 8B) such that the total bandwidth of the combined received signals (including the guard bands) is less than or equal to the input bandwidth of the ADC in the transceiver (such as one of ADCs 332A and 332B in transceiver 300 of FIG. 3).

In the embodiment described above with reference to FIG. 8A, the down-conversion frequency can be 317.5 MHz and the down-conversion frequency can be 7,910 MHz. It follows that first intermediate frequency 816 is 940 MHz, and second intermediate frequency 826 is 1,690 MHz.

Figure 8C:
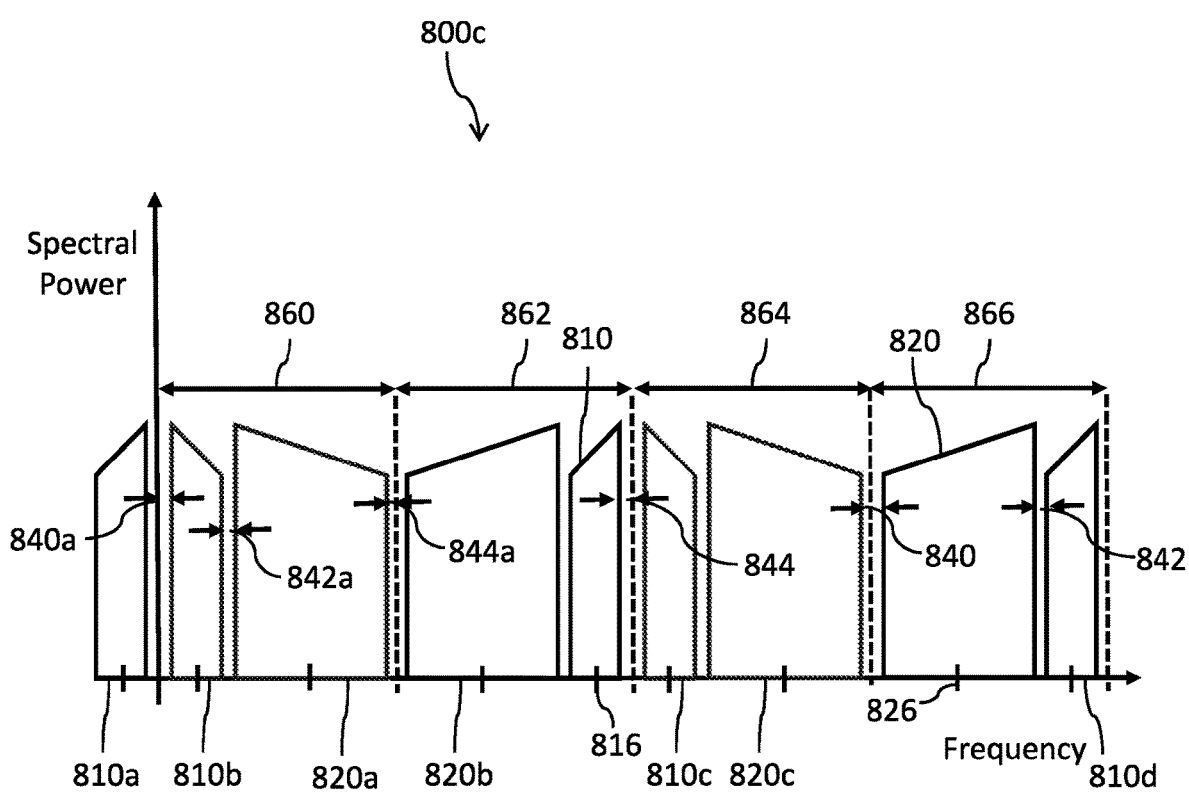
FIG. 8C is an exemplary simplified plot of spectral power distribution of the frequency division multiplexed received signals after band-pass sampling.

FIG. 8C is an exemplary simplified plot 800c of spectral power distribution of the frequency division multiplexed received signals after band-pass sampling. FIG. 8C shows frequency bands 810 and 820 after FDM mixed to intermediate frequencies 816 and 826 respectively.

Sampling of the combined dual-band received signal after 1-DM results in aliased spectra such as the spectra shown in FIG. 8C (spectra 810A through 810D and 820A through 820C). The frequency bands (center frequencies and bandwidths), up- and/or down-conversion frequencies, guard bands, and ADC sampling frequency can be selected to generate aliased spectra in a plurality of regions of the frequency range, for example regions 860, 862, 864 and 866—also known as Nyquist zones.

The first Nyquist zone 860 is also known as the Nyquist bandwidth and is the region of the spectrum between 0 Hz and half the ADC sampling frequency. The frequency spectrum can be divided into an infinite number of Nyquist zones, each having a width of half the ADC sampling frequency. FIG. 8C shows the first, second, third and fourth Nyquist zones 860, 862, 864 and 866, respectively.

Guard bands 840, 842 and 844 (first described with reference to FIG. 8B) comprise a narrow frequency range separating first and second bands 810 and 820 from each other (or aliased versions of each other) and from other frequencies on either side of bands 810 and 820. Guard bands 840, 842 and 844 can reduce or eliminate unwanted cross-talk or interference between frequency bands such as bands 810 and 820.

In the embodiment described above with reference to FIG. 8A, the sum of the bandwidths of guard bands 840, 842 and 844 (or equivalently any aliased version of guard bands 840, 842 and 844, such as 840a, 842a and 844a) can be 65 MHz. It follows that the total bandwidth of the combined received signals, including the bandwidths of the X- and L-band signals and the guard bands, can be 500 MHz.

Figure 8D:
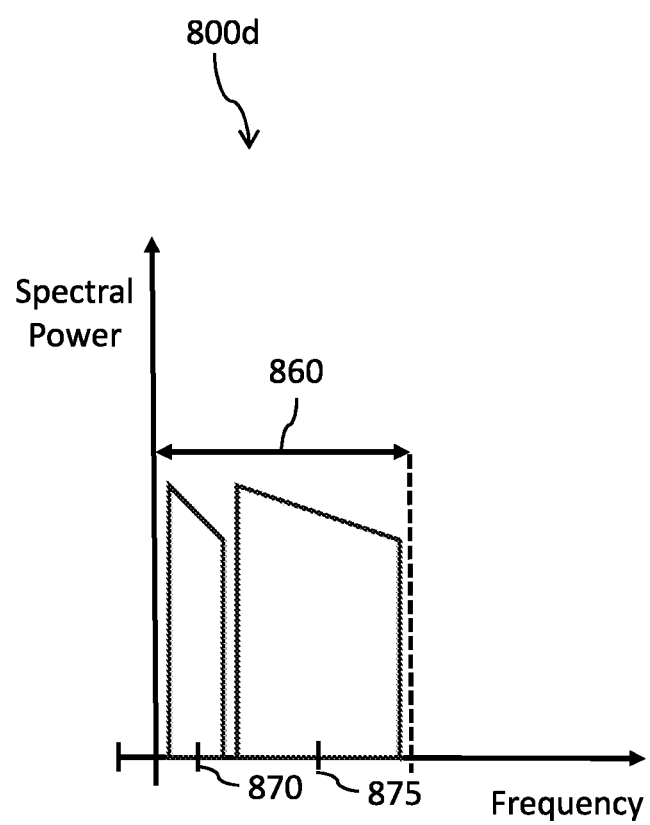
FIG. 8D is an exemplary simplified plot of spectral power distribution of the frequency division multiplexed received signals after band-pass sampling illustrating the desired part of the spectrum.

FIG. 8D is an exemplary simplified plot 800d of spectral power distribution of the frequency division multiplexed received signals after band-pass sampling illustrating the desired part of the spectrum. The aliased spectra in the first Nyquist zone 860 (also known as the Nyquist bandwidth) have center frequencies 870 and 875, and lie between 0 Hz and the input bandwidth of the ADC.

Frequency planning and spur analysis can be performed to support the selection of frequency bands (center frequencies and bandwidths), up- and/or down-conversion frequencies, guard bands, and ADC sampling frequency.

Spur analysis can include determining a measure of spectral purity over the band of interest. The harmonic imperfections of the signal generators and/or the ADC can be measured in terms of a spurious free dynamic range (SFDR). The SFDR can be defined as the ratio of the amplitudes of the fundamental frequency and the largest spur, and is usually expressed in units of dB.

Figure 9:
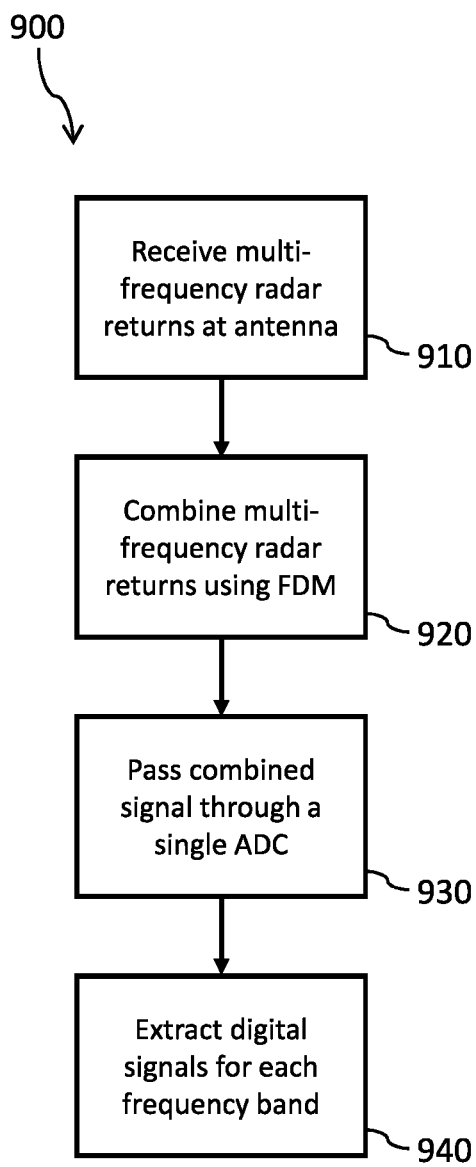
FIG. 9 is a flow chart illustrating a method for receiving signals in a multi-frequency SAR.

FIG. 9 is a flow chart illustrating a method for receiving signals in a multi-frequency SAR. The multi-frequency SAR can be configured to perform simultaneous acquisition of SAR images at more than one frequency of illumination.

At 910, the SAR antenna receives radar returns from pulses transmitted at different frequency bands. In the example of a dual-band radar operating at X-band and L-band, the SAR antenna receives X-band pulses and L-band pulses that were transmitted by the SAR and back-scattered from the terrain.

At 920, one or more frequency division multiplexing (FDM) multiplexers, e.g., FDM multiplexer 600 (FIG. 6), frequency division multiplexes the received multi-frequency returns to generate a single combined analog signal.

At 930, the combined analog signal is passed through a single analog-to-digital converter (ADC) such as ADC 710 of FIG. 7. The ADC samples the signal.

At 940, a digital processing unit 715 (FIG. 7) mixes and filters the digital SAR data to extract samples corresponding to the signal each frequency band. The digital data corresponding to each frequency band can be extracted as inphase and quadrature components or as real-valued signals.

Similarly, the approach described above with reference to the receive channels of the SAR payload can be used on the transmit channels. Two or more frequency bands (or two or more channels) can be combined digitally, for example in an FPGA. The combined signal can be passed through a single DAC. The resulting analog signal can be filtered, demultiplexed and up-converted to the center frequencies for transmission of pulses in each frequency band.

Figure 10:
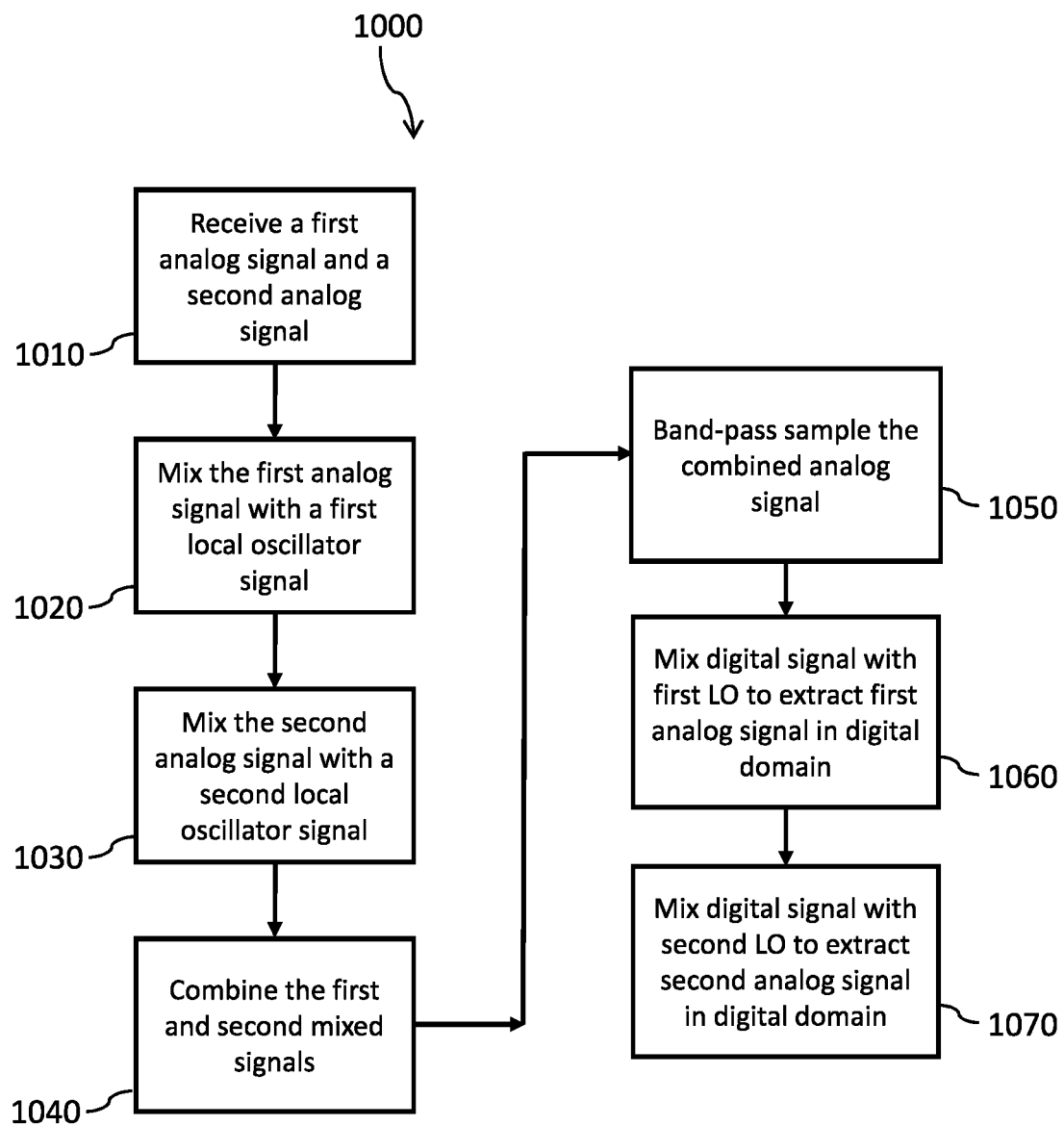
FIG. 10 is a flow chart illustrating a method for receiving signals in a multi-frequency or multi-channel SAR.

FIG. 10 is a flow chart illustrating a method 1000 for receiving signals in a multi-frequency or multi-channel SAR. Method 1000 is a more detailed view of method 900 of FIG. 9. Method 1000 comprises acts 1010 through 1070.

Method 1000 starts at 1010. At 1010, the SAR receives a first analog signal having a first center frequency and a first bandwidth, and a second analog signal having a second center frequency and a second bandwidth.

At 1020, the SAR mixes the first analog signal with a first local oscillator signal to shift the first center frequency to a first intermediate frequency to generate a frequency-shifted first signal. Similarly, at 1030, the SAR mixes the second analog signal with a second local oscillator signal to shift the second center frequency to a second intermediate frequency to generate a frequency-shifted second signal.

At 1040, the SAR combines the first and second frequency-shifted signals to generate a combined analog receive signal. At 1050, the SAR band-bass samples the combined analog receive signal to generate a digital baseband signal comprising an in-phase component and a quadrature component. The band-pass sampling can be implemented using an ADC.

At 1060, the SAR mixes the digital signal with a first local oscillator signal to extract the first analog signal in the digital domain. At 1070, the SAR mixes the digital signal with a second local oscillator signal to extract the second analog signal in the digital domain.

While the embodiments illustrated and described above relate to dual-band SAR, the approach applies to any multi-frequency (multi-band) SAR for which the multiple frequency bands can be frequency division multiplexed, i.e. mixed from their center frequencies to intermediate frequencies and accommodated within the bandwidth of a single ADC. An example of a three-band SAR is an X-, L- and C-band SAR. The approach described herein can also be applied to a single frequency multi-channel SAR.

While particular elements, embodiments and applications of the present technology have been shown and described, it will be understood, that the technology is not limited thereto since modifications can be made by those skilled in the art without departing from the scope of the present disclosure, particularly in light of the foregoing teachings.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation of a digital beamforming synthetic aperture radar (SAR), the method comprising:
    receiving a first analog signal having a first center frequency and a first bandwidth;
    receiving a second analog signal having a second center frequency and a second bandwidth;
    mixing the first analog signal with a first local oscillator signal by at least one mixer to shift the first center frequency to a first intermediate frequency to generate a frequency-shifted first signal having a first spectral band;
    mixing the second analog signal with a second local oscillator signal by at least one mixer to shift the second center frequency to a second intermediate frequency to generate a frequency-shifted second signal having a second spectral band, the second spectral band of the second frequency-shifted signal positioned at a defined frequency offset from the first spectral band of the first frequency-shifted signal, and the second spectral band of the second frequency-shifted signal positioned non-overlapping with the first spectral band of the first frequency-shifted signal;
    combining the first and the second frequency-shifted signals by at least one combiner to generate a combined analog receive signal; and
    band-pass sub-sampling, via an analog to digital converter, the combined analog receive signal at less than the Nyquist rate to generate an aliased digital baseband signal having:
        i) a first guard band between a high frequency cut-off of the Nyquist bandwidth and the first spectral band of the first frequency-shifted signal, the first guard band having a width that exceeds a defined first width threshold;
        ii) a second guard band between the first spectral band of the first frequency-shifted signal and the second spectral band of the second frequency-shifted signal, the second guard band having a width that exceeds a defined second width threshold;
        iii) a third guard band between the second spectral band of the second frequency-shifted signal and a low frequency cut-off of the Nyquist bandwidth, the third guard band having a width that exceeds a defined third width threshold, and the digital baseband signal having a bandwidth that is less than the input bandwidth of the analog-to-digital converter which performs the sampling of the combined analog receive signal; and
    band-pass sampling the combined analog receive signal by the analog-to-digital converter having an input bandwidth to generate a digital baseband signal comprising digital signal data representative of the first analog signal and digital signal data representative of the second analog signal.

2. The method of claim 1 further comprising:
    mixing the digital baseband signal with a third local oscillator signal by at least one digital mixer to extract the digital signal data representative of the first analog signal; and
    mixing the digital baseband signal with a fourth local oscillator signal by at least one digital mixer to extract the digital signal data representative of the second analog signal.

3. The method of claim 1 wherein receiving a second analog signal comprises receiving the second analog signal concurrently with receiving the first analog signal.

4. The method of claim 3 wherein receiving a second analog signal having a second center frequency and a second bandwidth comprises receiving the second analog signal having the second center frequency which is different from the first center frequency of the first analog signal.

5. The method of claim 3 wherein receiving a first analog signal having a first center frequency and a first bandwidth includes receiving the first analog signal on a first channel, and receiving a second analog signal having a second center frequency and a second bandwidth comprises receiving the second analog signal on a second channel, the second channel different from the first channel, and the second center frequency of the second analog signal equal to the first center frequency of the first analog signal.

6. The method of claim 1 wherein mixing the first analog signal with a first local oscillator signal by at least one mixer comprises mixing the first analog signal with the first local oscillator signal to position the first spectral band in the Nyquist bandwidth after band-pass sampling the combined analog receive signal by an analog-to-digital converter, and mixing the second analog signal with a second local oscillator signal by at least one mixer comprises mixing the second analog signal with the second local oscillator signal to position the second spectral band in the Nyquist bandwidth, and non-overlapping with the first spectral band, after band-pass sampling the combined analog receive signal by an analog-to-digital converter.

7. The method of claim 1, further comprising:
receiving a third analog signal having a third center frequency and a third bandwidth; and
mixing the third analog signal with a third local oscillator signal by at least one mixer to shift the third center frequency to the intermediate frequency to generate a frequency-shifted third signal having a third spectral band.

8. The method of claim 1 wherein combining the first and the second frequency-shifted signals by at least one combiner to generate a combined analog receive signal comprises combining the first and the second frequency-shifted signals by the at least one combiner to generate the combined analog receive signal having a bandwidth that is less than the input bandwidth of the analog-to-digital converter which performs the band-pass sampling of the combined analog receive signal.

9. The method of claim 1, further comprising: selecting at least one of: the first and the second center frequencies, the first and the second bandwidths, the first and the second intermediate frequencies, the first, the second, and the third guard bands or a sampling frequency of the analog-to-digital converter to ensure that a measure of spectral purity is greater than a defined spectral purity threshold.

10. The method of claim 9 wherein the measure of spectral purity is related to a spurious free dynamic range.

11. The method of claim 1 wherein at least one of the mixing the first analog signal with a first local oscillator signal or the mixing the second analog signal with the second oscillator signal comprises down converting the first or second analog signal.

12. The method of claim 1 wherein at least one of the mixing the first analog signal with a first local oscillator signal or the mixing the second analog signal with the second oscillator signal comprises up converting the first or second analog signal.

13. The method of claim 1 wherein at least one of the mixing the first analog signal with a first local oscillator signal or the mixing the second analog signal with the second oscillator signal comprises up converting one of the first or second analog signals and down converting the other one of the first of the second analog signals.

* * * * *